United States Patent
Endo et al.

(10) Patent No.: US 11,100,682 B2
(45) Date of Patent: Aug. 24, 2021

(54) IMAGE PROCESSING DEVICE AND IMAGE PROCESSING METHOD

(71) Applicant: SONY CORPORATION, Tokyo (JP)

(72) Inventors: Tomoyuki Endo, Tokyo (JP); Koji Kamiya, Kanagawa (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 16/480,919

(22) PCT Filed: Jan. 17, 2018

(86) PCT No.: PCT/JP2018/001131
§ 371 (c)(1),
(2) Date: Jul. 25, 2019

(87) PCT Pub. No.: WO2018/159125
PCT Pub. Date: Sep. 7, 2018

(65) Prior Publication Data
US 2020/0013198 A1    Jan. 9, 2020

(30) Foreign Application Priority Data
Feb. 28, 2017    (JP) .............................. JP2017-036949

(51) Int. Cl.
*G06T 11/00*    (2006.01)
*G06T 7/80*    (2017.01)
(Continued)

(52) U.S. Cl.
CPC .............. *G06T 11/001* (2013.01); *G06T 1/20* (2013.01); *G06T 7/80* (2017.01); *G06T 1/0007* (2013.01);
(Continued)

(58) Field of Classification Search
None
See application file for complete search history.

(56) References Cited

U.S. PATENT DOCUMENTS

2005/0024384 A1*    2/2005    Evans ..................... H04N 9/67
345/604
2011/0169881 A1*    7/2011    Wallener .............. G09G 3/3611
345/690
(Continued)

FOREIGN PATENT DOCUMENTS

CN    105474631 A    4/2016
EP    3 038 352 A1    6/2016
(Continued)

OTHER PUBLICATIONS

International Search Report dated Apr. 10, 2018 in PCT/JP2018/001131, 2 pages.
(Continued)

*Primary Examiner* — Tapas Mazumder
(74) *Attorney, Agent, or Firm* — Oblon, McClelland, Maier & Neustadt, L.L.P.

(57) ABSTRACT

To enable proper adjustment of a monitor using a color bar regardless of a difference in transfer functions.
Provided is an image processing device including a determination unit configured to determine a transfer function related to conversion between light and an image signal and to be used in a display device among a plurality of transfer functions, and a generation unit configured to generate a color bar signal corresponding to the transfer function determined by the determination unit and output the generated color bar signal to the display device.

16 Claims, 26 Drawing Sheets

(51) Int. Cl.
*G06T 1/20* (2006.01)
*G06T 1/00* (2006.01)
*G06T 1/60* (2006.01)

(52) U.S. Cl.
CPC ...... *G06T 1/60* (2013.01); *G06T 2207/10024* (2013.01)

(56) References Cited

U.S. PATENT DOCUMENTS

| | | | |
|---|---|---|---|
| 2013/0328842 A1* | 12/2013 | Barnhoefer | G06F 3/044 345/207 |
| 2015/0243200 A1* | 8/2015 | Pan | G06T 5/009 345/590 |
| 2015/0249848 A1 | 9/2015 | Holman | |
| 2016/0212399 A1 | 7/2016 | Uchimura | |
| 2017/0085827 A1 | 3/2017 | Terada et al. | |
| 2017/0301284 A1* | 10/2017 | Homer | G06F 1/1601 |

FOREIGN PATENT DOCUMENTS

| | | |
|---|---|---|
| JP | 2016-82388 A | 5/2016 |
| JP | 2016-134682 A | 7/2016 |
| WO | WO 2015/025726 A1 | 2/2015 |
| WO | WO 2015/190044 A1 | 12/2015 |

OTHER PUBLICATIONS

Extended European Search Report dated Jan. 2, 2020 in corresponding European Patent Application No. 18761298.1, 48 pages.
Arib Std-B66: "UHDTV Multiformat Color Bar Arib Standard", Jul. 6, 2016, XP055648274; 25 pages Retrieved from the Internet: URL:http://www.arib.or.jp/english/html/overview/doc/6-STD-B66v1_2-E1.pdf [retrieved on Dec. 2, 2019].
ITU-R, "Recommendation ITU-R BT.2111-0, Specification of Colour Bar Test Pattern for High Dynamic Range Television Systems BT Series Broadcasting Service (Television)", Dec. 2017, 14 pages.

* cited by examiner

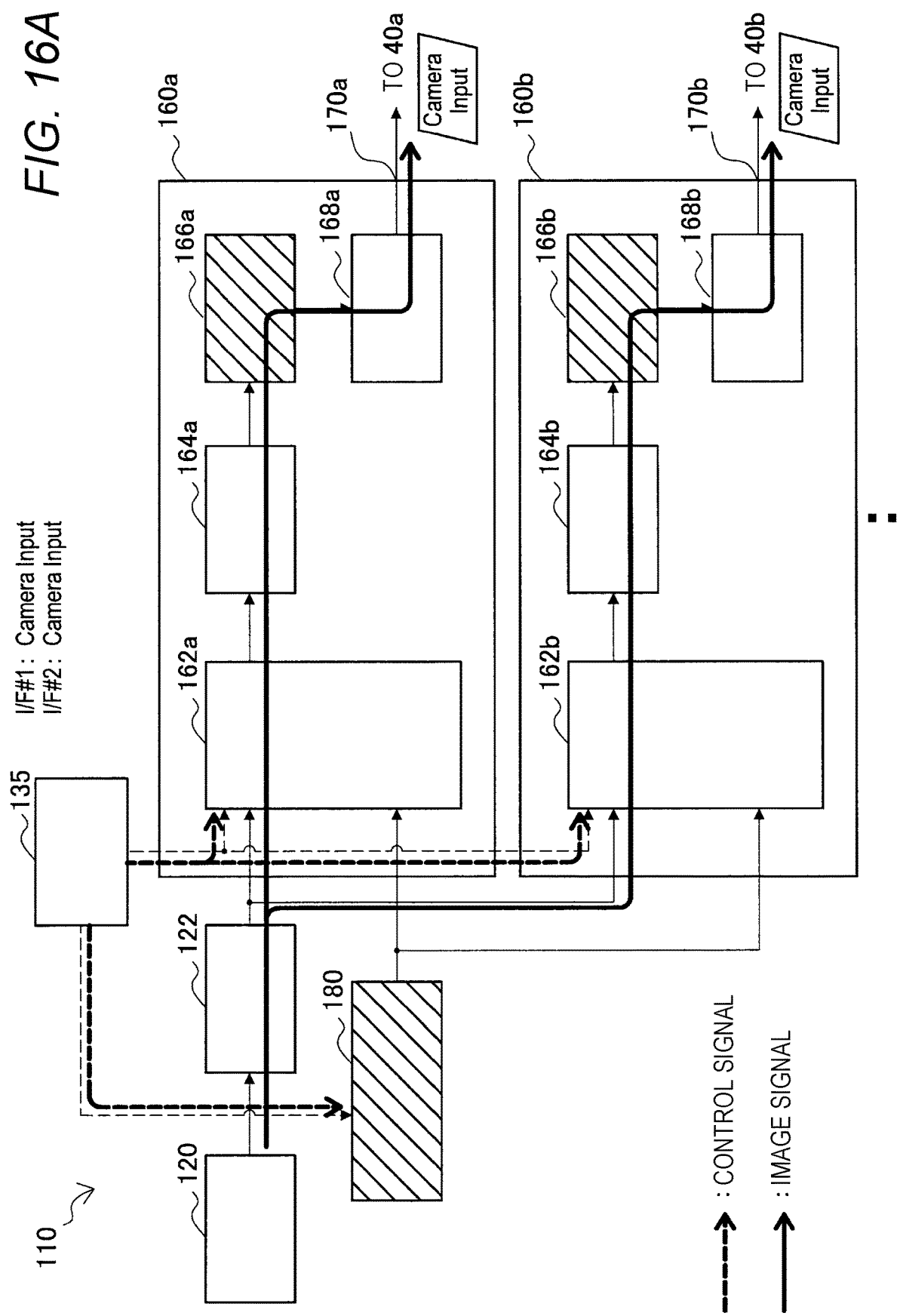

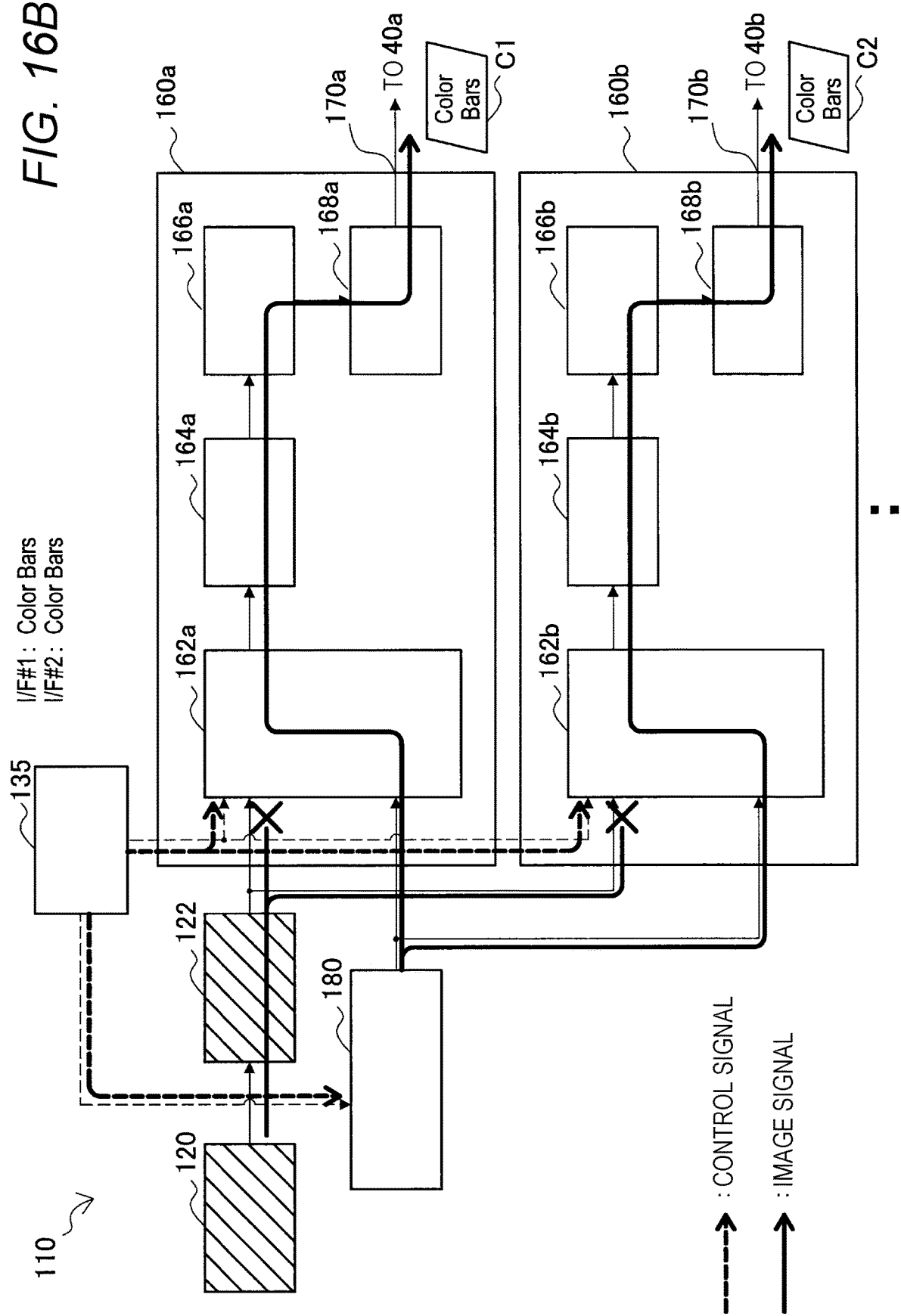

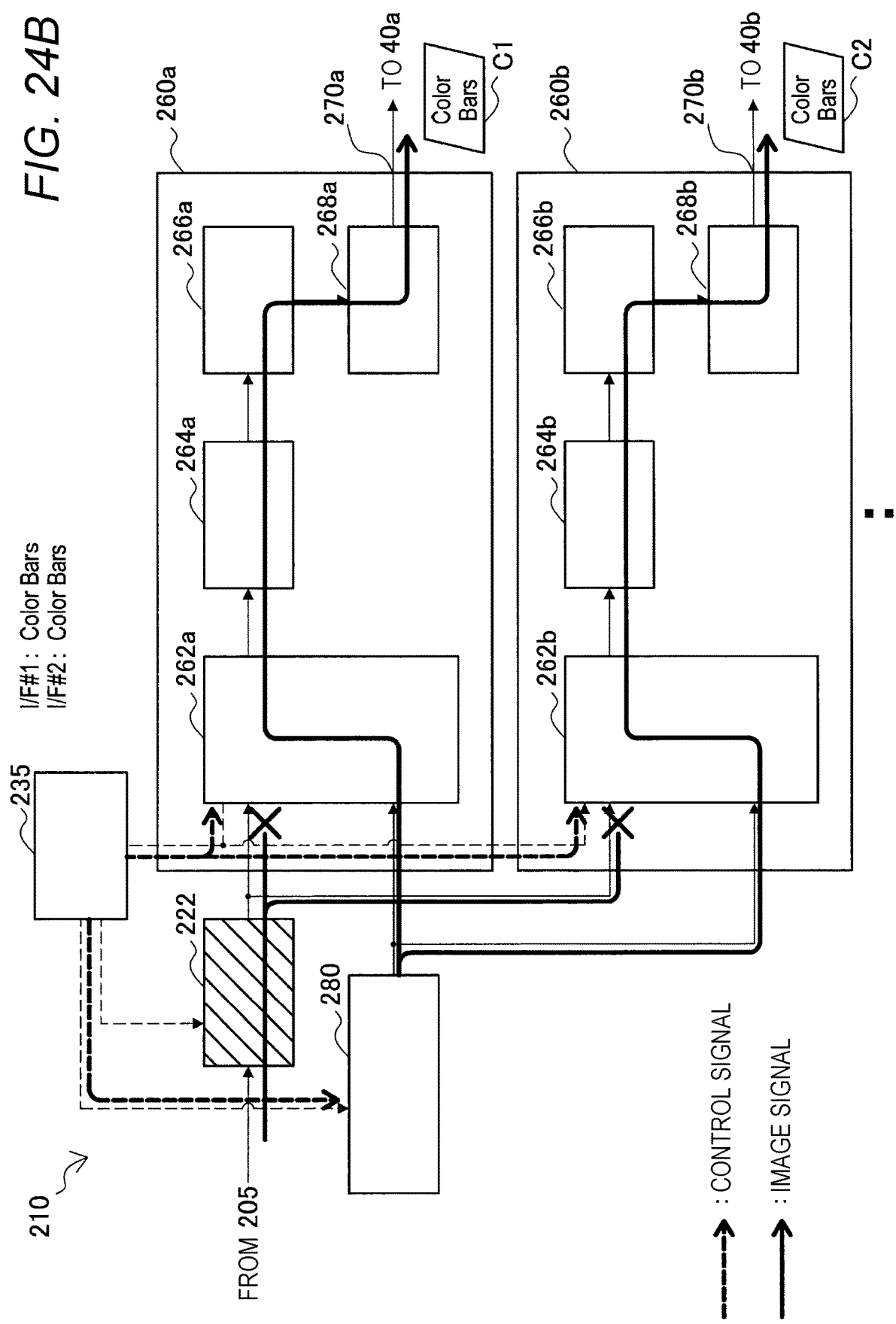

IMAGE PROCESSING DEVICE AND IMAGE PROCESSING METHOD

TECHNICAL FIELD

The present disclosure relates to an image processing device and an image processing method.

BACKGROUND ART

In recent years, expansion of video signal expression to enable more faithful reproduction of a state of the real world or display of a video with richer brightness and colors has been in progress. High dynamic range (HDR) is a concept intended to express an image or a video in a luminance dynamic range wider than a conventional standard dynamic range (SDR). For example, the standard specification BT.2100 recommended by International Telecommunication Union-Radio communications sector (ITU-R) defines two types of transfer functions called hybrid log-gamma (HLG) and perceptual quantization (PQ) as signal transfer functions for HDR (also called tone curves or gamma curves) (see Non-Patent Document 1). Furthermore, there is also a non-standard transfer function for HDR, such as S-Log3. By converting light into an image signal and converting the image signal into light according to these transfer functions, real-world light having luminance higher than 100 nit can be reproduced on a screen. As another example, BT.2020 standardized by ITU-R defines a color gamut that enables more vivid colors than the color gamut of BT.709 having been used in many applications so far.

In general, business operators that produce, broadcast, or distribute video content use color bars for optimizing how the video content looks on a monitor. A color bar having some reference colors for reference arranged in predetermined regions is displayed on the monitor, and settings of the monitor are adjusted to optimize the brightness and colors of the displayed color bar, so that how the video content displayed on the monitor looks is also optimized. As standard specifications of the color bars, there are ARIB STD-B28 described in Non-Patent Document 2, SMPTE RP219 described in Non-Patent Document 3, and the like. Non-standard color bars such as full color bars can also be used.

Patent document 1 discloses a technology for converting a signal value of a color bar defined for BT.2020 using a look-up table before outputting the signal value to a monitor using BT.709, such that a signal level of a color bar displayed on a monitor using BT.2020 as the color gamut coincides with a signal level of a color bar displayed on a monitor using BT.709 as the color gamut.

CITATION LIST

Non-patent Document

Non-Patent Document 1: ITU-R, "Image parameter values for high dynamic range television for use in production and international programme exchange", Recommendation ITU-R BT.2100-0, July 2016
Non-Patent Document 2: ARIB, "MULTIFORMAT COLOR BAR", ARIB STD-B28 Version 1.0, Dec. 14, 2000
Non-Patent Document 3: SMPTE, "SMPTE RECOMMENDED PRACTICE Ultra High-Definition, 2048×1080 and 4096×2160 Compatible Color Bar Signal", SMPTE RP 219-2: 2016, Sep. 16, 2016

Patent Document

Patent Document 1: Japanese Patent Application Laid-Open No. 2016-082388

SUMMARY OF THE INVENTION

Problems to be Solved by the Invention

The existing color bar specifications are designed on the premise of SDR display. However, the same code value in the image signal for SDR and in the image signal for HDR expresses different brightness. In general, in a case of displaying an image with the same code value on a monitor for HDR, a brighter display image can be obtained than a case of displaying an image with the same code value on a monitor for SDR. Due to a difference in tone curves, the same code value may express a difference in brightness and color even between two transfer functions for HDR. Therefore, in a case of displaying a color bar based on the single specification using different transfer functions, a difference occurs in how the color bar looks, and adjustment of the monitor is not successful. In particular, when the existing color bar designed on the premise of SDR display is displayed on a monitor for HDR, the color bar is displayed excessively bright, and appropriate adjustment of the monitor is difficult.

Therefore, realization of a technology that enables proper adjustment of a monitor using a color bar regardless of a difference in transfer functions is desired.

Solutions to Problems

According to the present disclosure, provided is an image processing device including a determination unit configured to determine a transfer function related to conversion between light and an image signal and to be used in a display device among a plurality of transfer functions, and a generation unit configured to generate a color bar signal corresponding to the transfer function determined by the determination unit and output the generated color bar signal to the display device.

Furthermore, according to the present disclosure, provided is an image processing method including, in an image processing device, determining a transfer function related to conversion between light and an image signal and to be used in a display device among a plurality of transfer functions, generating a color bar signal corresponding to the determined transfer function, and outputting the generated color bar signal to the display device.

Effects of the Invention

According to the technology of the present disclosure, a monitor can be properly adjusted using a color bar regardless of a difference in transfer functions.

Note that the above-described effect is not necessarily restrictive, and any one of effects described in the present specification or any another effect obtainable from the present specification may be exhibited in addition to or in place of the above-described effect.

BRIEF DESCRIPTION OF DRAWINGS

FIG. 16A is a first explanatory diagram for describing selection of an output signal in the imaging device illustrated in FIG. 14.

FIG. 16B is a second explanatory diagram for describing selection of an output signal in the imaging device illustrated in FIG. 14.

FIG. 24B is a second explanatory diagram for describing selection of an output signal in the signal conversion device illustrated in FIG. 23.

MODE FOR CARRYING OUT THE INVENTION

Favorable embodiments of the present disclosure will be described in detail with reference to the appended drawings. Note that, in the present specification and drawings, overlapping description of configuration elements having substantially the same functional configuration is omitted by providing the same sign.

Furthermore, description will be given in the following order.

1. Description of Related Technology
1-1. SDR and HDR
1-2. Various Characteristic Definition Techniques
1-3. Description of Problems
1-4. Basic Principle
2. First Embodiment
2-1. Outline of System
2.2. First Configuration Example of Imaging Device
2.3. Second Configuration Example of Imaging Device
3. Second Embodiment
3-1. Outline of System
3-2. First Configuration Example of Signal Conversion Device
3-3. Second Configuration Example of Signal Conversion Device
4. Hardware Configuration Example
5. Conclusion

1. DESCRIPTION OF RELATED TECHNOLOGY

[1-1. SDR and HDR]

In recent years, expansion of video signal expression to enable more faithful reproduction of a state of the real world or display of a video with richer brightness and colors has been in progress. HDR is a concept that attempts to express an image or a video with a wider luminance dynamic range than conventional standard dynamic range SDR.

Figure 1:
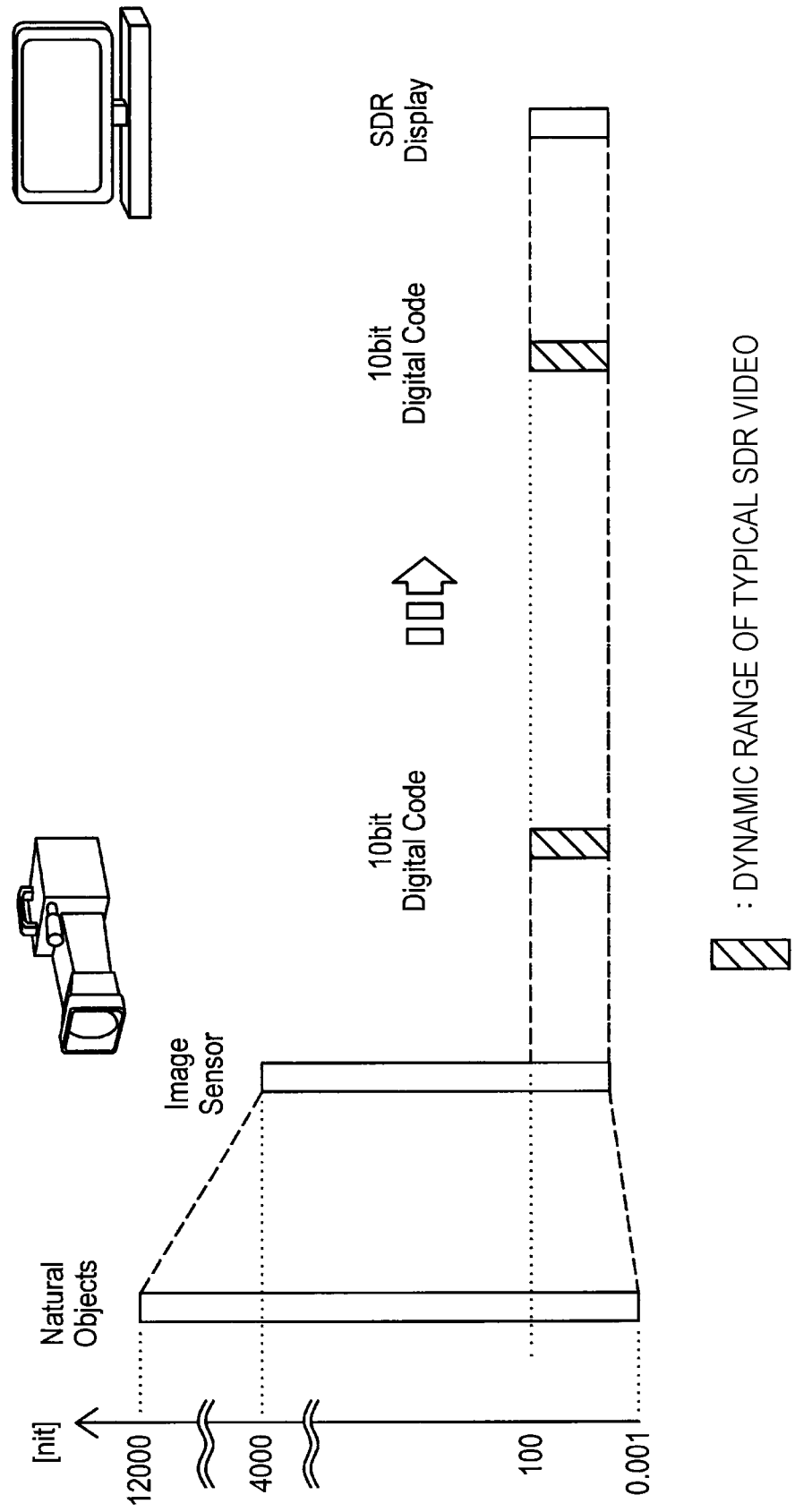
FIG. 1 is an explanatory diagram for describing a luminance dynamic range of an SDR video.

FIG. 1 is an explanatory diagram for describing a luminance dynamic range of an SDR video. The vertical axis in FIG. 1 represents luminance [nit]. The maximum luminance in the natural world may reach 20000 nit, and the luminance of a general object is, for example, at most about 12000 nit. A dynamic range of an image sensor may be narrower than the maximum luminance in the natural world, and an upper limit can be 4000 nit, for example, in a case where a lower limit is set to 0.001 nit. An imaging device such as a digital camera or digital camcorder converts an electrical signal generated by photoelectrically converting incident light in an image sensor into, for example, a 10-bit digital image signal in a signal processing circuit at a subsequent stage of the image sensor. A signal format of an old SDR image loses gradation of high-luminance parts exceeding 100 nit during such conversion. The digital image signal generated by the imaging device is transmitted to a display device. The digital image signal may be encoded into a coded bit stream by a predetermined video coding scheme prior to transmission, and the image signal may be restored from the coded bit stream on a receiving side. The display device reproduces a video at display luminance of the upper limit of 100 nit on the basis of an acquired SDR image signal.

Figure 2:
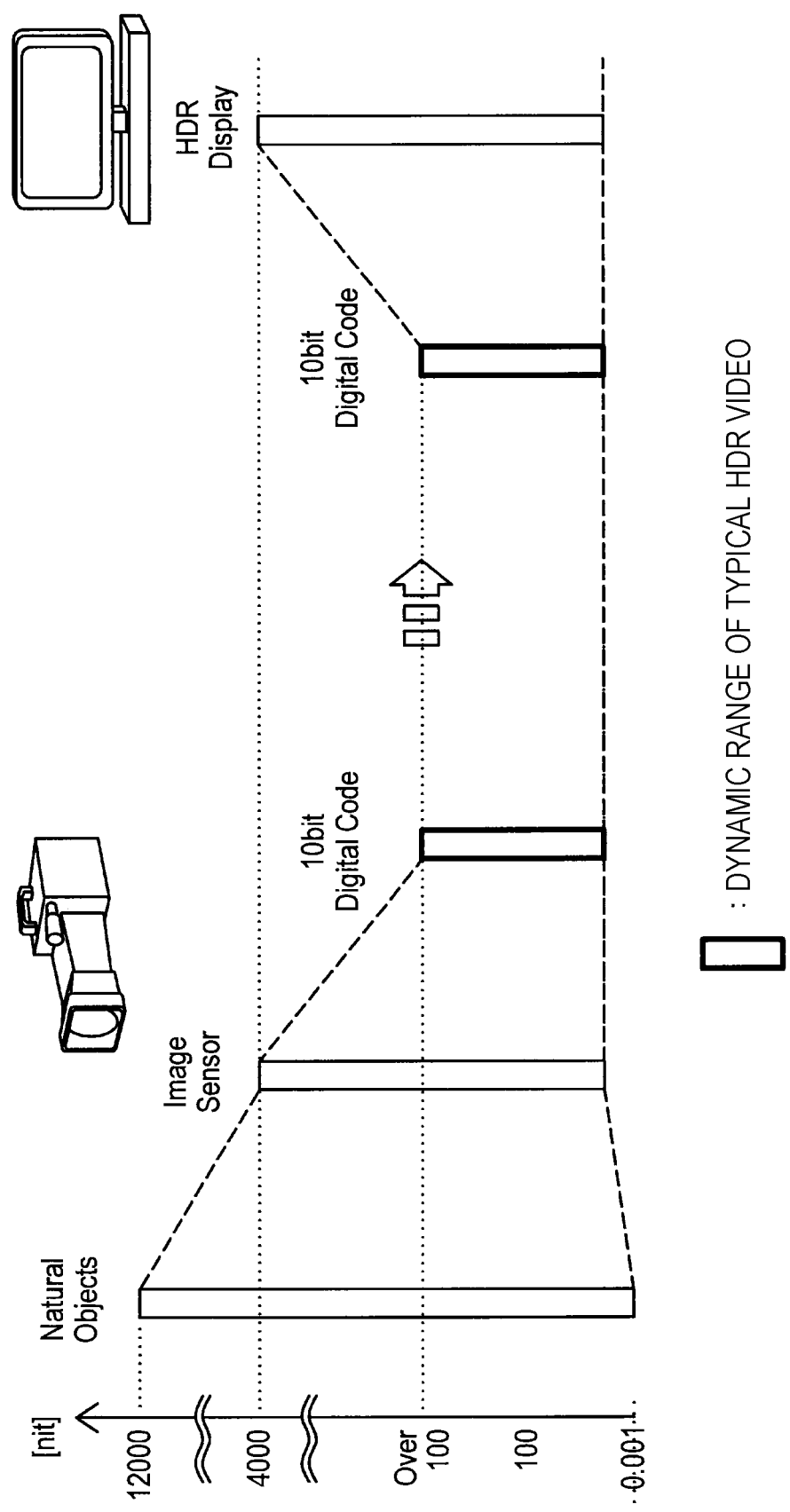
FIG. 2 is an explanatory diagram for describing a luminance dynamic range of an HDR video.

FIG. 2 is an explanatory diagram for describing a luminance dynamic range of an HDR video. Similarly to the case of the SDR, the imaging device converts incident light on the image sensor into an analog electrical signal and further converts the analog electrical signal into, for example, a 10-bit digital image signal. A signal format of the HDR video maintains gradation of high-luminance parts exceeding 100 nit during such conversion, and enables reproduction of a video with the luminance up to an upper limit of several hundred or several thousand nit. The digital image signal generated by the imaging device is transmitted to a display device. Again, the digital image signal may be encoded/decoded upon transmission. The display device reproduces the video in a luminance dynamic range including display luminance higher than 100 nit on the basis of the acquired HDR image signal. The maximum display luminance can reach, for example, 1200 nit in a case where HLG is used as a gamma curve, 10000 nit in a case where PQ is used, and 4000 nit in a case where S-Log 3 is used.

Note that, as a reference for classifying the SDR and the HDR, it is assumed here that the case where the upper limit of the luminance dynamic range is equal to or less than 100 nit is the SDR, and the case where the upper limit exceeds 100 nit is the HDR. However, at some point in the future, a dynamic range prevailing at the point of time (in other words, becoming a standard) and a newer dynamic range (with higher upper limit) may be classified as the HDR and the SDR, respectively, with higher reference values than 100 nit. The SDR is sometimes referred to as low dynamic range (LDR) in comparison with the HDR.

[1-2. Various Characteristic Definition Techniques]

Figure 3:
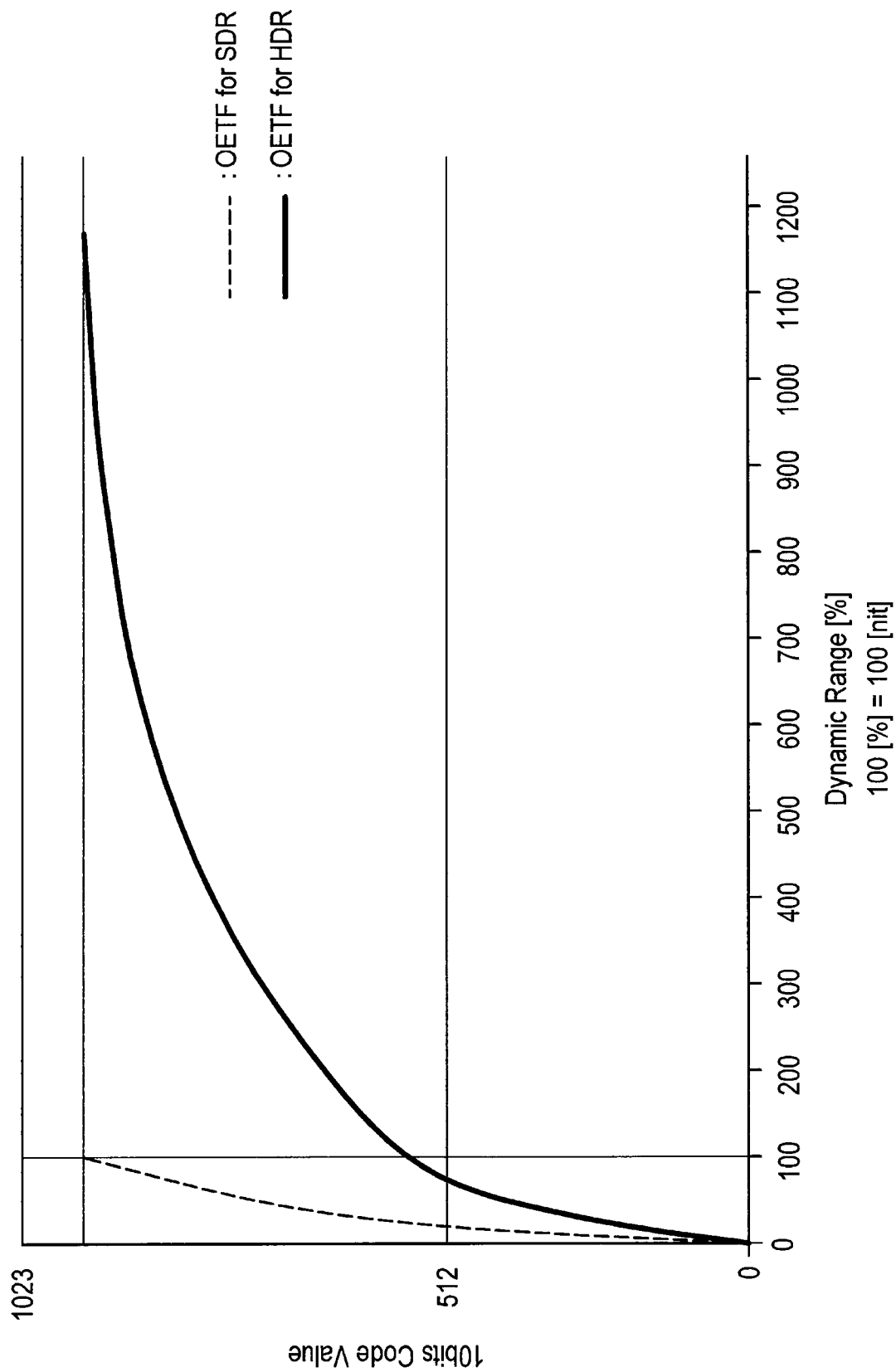
FIG. 3 is an explanatory diagram illustrating examples of OETFs in a signal format for SDR and in a signal format for HDR.

In general, characteristics of signal conversion from light to an image signal in an imaging device are modeled by an opto-electronic transfer function (OETF). FIG. 3 illustrates respective examples of an OETF in a typical signal format for SDR and an OETF in a typical signal format for HDR. In FIG. 3, the horizontal axis represents a luminance dynamic range of light before conversion, and 100% corresponds to the luminance of 100 nit. The vertical axis represents a code value of an image signal after conversion, and the code value can take values from 0 to 1023 in the case of 10 bits. When comparing the OETF in the signal format for SDR illustrated by the broken line with the OETF for HDR illustrated by the solid line in FIG. 3, a difference in slopes of the transfer functions is remarkable especially in part where code values are relatively large. This means that in such part, image information is compressed at a higher compression ratio in the case of HDR than the case of the SDR, that is, similar code values indicate higher luminance in the case of the HDR than the case of SDR.

When reproducing an HDR video, a voltage level to be supplied to a display element can be determined by applying an electro-optical transfer function (EOTF) that is an inverse function of the OETF illustrated by the solid line in FIG. 3 to the code value of the image signal in many cases. Then, individual images that configure the HDR image are displayed in a luminance dynamic range extended by the application of the EOTF. Signal transfer characteristics for HDR are usually specified by defining one of the OETF or the EOTF. OOTF may be additionally defined as a transfer function of the entire system. Table 1 below shows, in the standard specification BT.2100 recommended by ITU-R, what kinds of transfer functions are directly defined by the signal transfer characteristics for two HDRs: HLG and PQ.

[Table 1]

TABLE 1

| Definition of signal transfer characteristics in HLG and PQ | | |
|---|---|---|
| Transfer function | HLG | PQ |
| OETF | Defined by mathematical expression | Composite function of $EOTF^{-1}$ and OOTF |
| EOTF | Composite function of $OETF^{-1}$ and OOTF | Defined by mathematical expression |
| OOTF | Defined by mathematical expression | Defined by mathematical expression |

As illustrated in Table 1, in HLG, the OETF and the OOTF are directly defined by mathematical expressions, and the EOTF is derived as a composite function of $OETF^{-1}$ (an inverse function of the OETF) and the OOTF. The OOTF in HLG will be applied on a monitor side together with the $OETF^{-1}$. Meanwhile, in PQ, the EOTF and the OOTF are directly defined by mathematical expressions, and the OETF is derived as a composite function of $EOTF^{-1}$ (an inverse function of the EOTF) and the OOTF. The OOTF in PQ will be applied on a camera side with $EOTF^{-1}$. In the present specification, "a transfer function for conversion between light and an image signal" or simply "a transfer function" includes a combination of any one or two or more of the OETF, the EOTF, the OOTF, and their inverse functions.

[1-3. Description of Problems]

In recent years where various expression techniques of video signals have begun to be put to practical use, there is an increasing number of cases where business operators that produce, broadcast, or distribute content verifies how the same video content looks using two or more monitors having different characteristics. A user who verifies how the content looks usually adjusts or calibrates settings of monitors using color bars prior to the verification in order to eliminate influence of individual differences in individual monitor characteristics on verification work.

Figure 4:
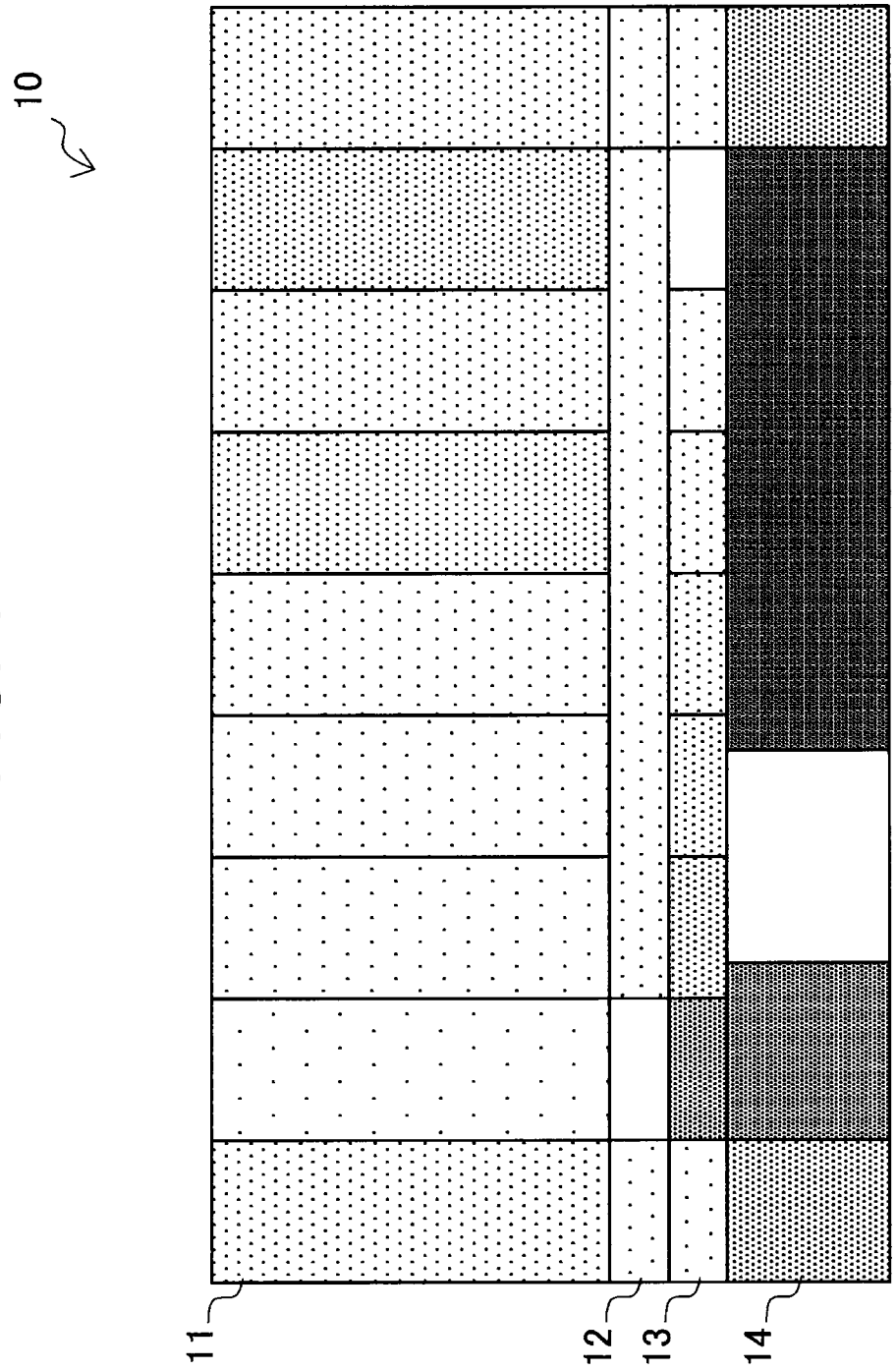
FIG. 4 is an explanatory diagram for describing an outline of an ARIB STD-B28 color bar that is one of standard color bars.

FIG. 4 is an explanatory diagram for describing an outline of an ARIB STD-B28 color bar that is one of currently used standard color bars. In the example in FIG. 4, a color bar 10 includes a first pattern 11 occupying 7/12 of the height at an upper part of the screen, a second pattern 12 occupying 1/12 of the height below the first pattern, a third pattern 13 occupying 1/12 of the height below the second pattern, and a fourth pattern 14 occupying 3/12 of the height at a lower part of the screen. The first pattern 11 is a set of nine vertically elongated bars having colors of 40% gray, 75% white, yellow, cyan, green, magenta, red, blue, and 40% gray in this order from the left. The color of the leftmost rectangle is cyan and the color of the rightmost rectangle is blue in the second pattern 12. The color of the leftmost rectangle is yellow and the color of the rightmost rectangle is red in the third pattern 13. Different levels of gray or white can be placed between the rectangles. Different levels of black, gray, or white can be placed in the different sized rectangles of the fourth pattern 14. Note that the color bar described here is merely an example. The technology according to the present disclosure is not limited to a specific type of color bar, and is applicable to any type of color bar, such as ARIB STD-B28, SMPTE RP 219, derivatives thereof, or full color bars.

As described above, the same code value in the image signal for SDR and the image signal for HDR expresses different brightness. In general, in a case of displaying an image with the same code value on a monitor for HDR, a brighter display image can be obtained than a case of displaying an image with the same code value on a monitor for SDR. Due to a difference in gamma curves, the same code value may express different brightness and color even between two transfer functions for HDR. However, the existing color bar specifications are designed on the premise of SDR display. Therefore, in a case of displaying a color bar based on a single specification on a plurality of monitors having different transfer functions to be used, a difference occurs in how the color bar looks, and proper adjustment of setting the monitors is not successful. For example, when the existing color bar designed on the premise of SDR display is displayed on the monitor for HDR, the color bar is displayed excessively bright. Therefore, in the present specification, some embodiments of the technology according to the present disclosure, which absorb a difference in transfer functions to enable proper adjustment of monitor setting using a color bar on a monitor, will be described.

[1-4. Basic Principle]

Figure 5:
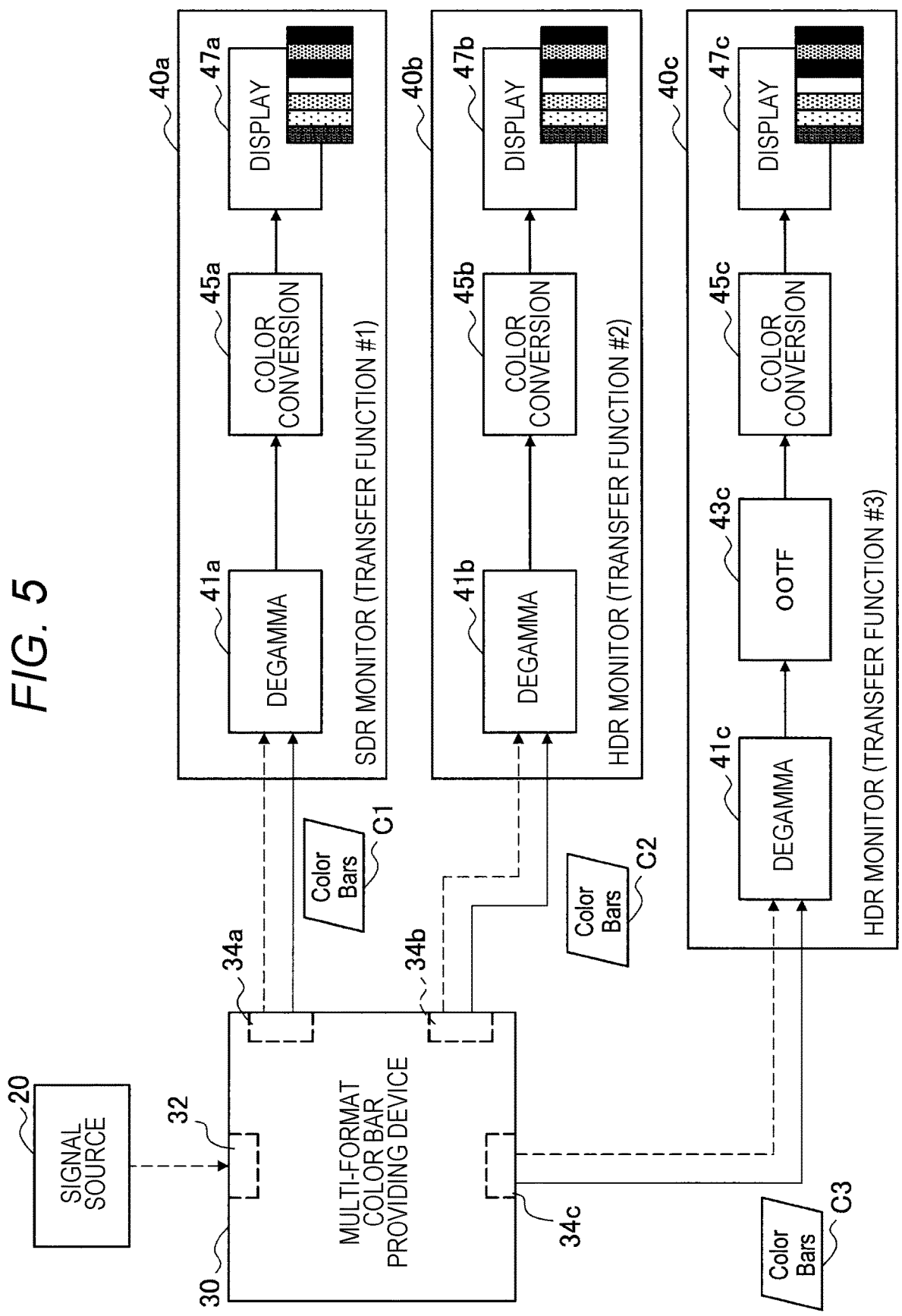
FIG. 5 is an explanatory diagram for describing a basic principle of the technology according to the present disclosure.

FIG. 5 is an explanatory diagram for describing a basic principle of the technology according to the present disclosure. In some embodiments of the technology according to the present disclosure, a multi-format color bar providing device 30 as illustrated in FIG. 5 is provided. The multi-format color bar providing device 30 determines a transfer function related to conversion between light and an image signal and to be used in a display device among a plurality of transfer functions, and outputs a color bar signal corresponding to the determined transfer function to the display device. In the example in FIG. 5, the multi-format color bar providing device 30 includes an input interface 32 that acquires an image signal from a signal source 20. For example, the multi-format color bar providing device 30 may be an imaging device or a signal processing device provided by the imaging device. In this case, the signal source 20 can be an image sensor. Alternatively, the multi-format color bar providing device 30 may be a signal conversion device existing on a transmission path between the imaging device and the display device. In this case, the signal source 20 can be an imaging device. The multi-format color bar providing device 30 further includes one or more output interfaces 34a, 34b, and 34c that can be each connected to display devices.

The output interface 34a is connected to a display device 40a. The display device 40a is a monitor that displays an SDR video using a first type of transfer function. The display device 40a executes inverse gamma (degamma) conversion 41a for an input image signal. For example, according to BT.1886 standardized for SDR by the ITU-R, a gamma value γ=2.4 is used. Note that, in general, another gamma value may be used, such as γ=2.2 or γ=2.6. The display device 40a further executes color conversion 45a to convert a color space of the image signal (for example, conversion from an YPbPr color system to an RGB color system). Then, the display device 40a performs display 47a of the SDR video at a signal level based on the converted image signal.

The output interface 34b is connected to a display device 40b. The display device 40b is a monitor that displays an HDR video using a second type of transfer function. The display device 40b executes inverse gamma (degamma) conversion 41b for an input image signal. The degamma conversion 41b is, for example, signal conversion using a composite function of $OETF^{-1}$ that is an inverse function of OETF and OOTF. The display device 40b further executes color conversion 45b to convert a color space of the image signal. Then, the display device 40b performs display 47b of the HDR video at a signal level based on the converted image signal.

The output interface 34c is connected to the display device 40c. The display device 40c is a monitor that displays an HDR video using a third type of transfer function. The display device 40c executes inverse gamma (degamma) conversion 41c for an input image signal. The degamma conversion 41c is, for example, signal conversion in accordance with the EOTF. The display device 40c also executes OOTF conversion 43c. The display device 40c further executes color conversion 45c to convert the color space of the image signal. Then, the display device 40c performs display 47c of the HDR video at a signal level based on the converted image signal.

Note that, in the following description, in a case where there is no need to distinguish the display devices 40a, 40b, and 40c from one another, these display devices will be collectively referred to as display device 40 by omitting the alphabets at the ends of the reference numerals. A similar rule applies to combinations of other components and reference numerals (for example, output interface 34 (34a, 34b, and 34c), and the like).

The multi-format color bar providing device 30 outputs the input image signal input from the signal source 20 to the display device 40 via the output interface 34 in a case where an output mode (hereinafter referred to as camera mode) for displaying a video from a camera is set. Meanwhile, the multi-format color bar providing device 30 outputs a color bar signal corresponding to the transfer function used in the display device 40 connected to the output interface 34 to the display device 40 in a case where an output mode (hereinafter referred to as color bar mode) for displaying a color bar is set. In the example in FIG. 5, a color bar signal C1 is output to the display device 40a, a color bar signal C2 is output to the display device 40b, and a color bar signal C3 is output to the display device 40c. The multi-format color bar providing device 30 stores color bar information (hereinafter referred to as reference color bar information) that defines a color bar signal (hereinafter referred to as a reference color bar signal) corresponding to at least one transfer function. In a case where the display device 40 is determined to use a reference transfer function, the multi-format color bar providing device 30 generates the reference color bar signal from the stored reference color bar information, and outputs the generated reference color bar signal to the display device 40. Meanwhile, in a case where the display device 40 uses a transfer function different from the transfer function that is a premise for the reference color bar signal, a color bar signal generated by applying signal conversion according to the transfer function to be used to the reference color bar signal is output from the multi-format color bar providing device 30 to the display device 40.

Figure 6:
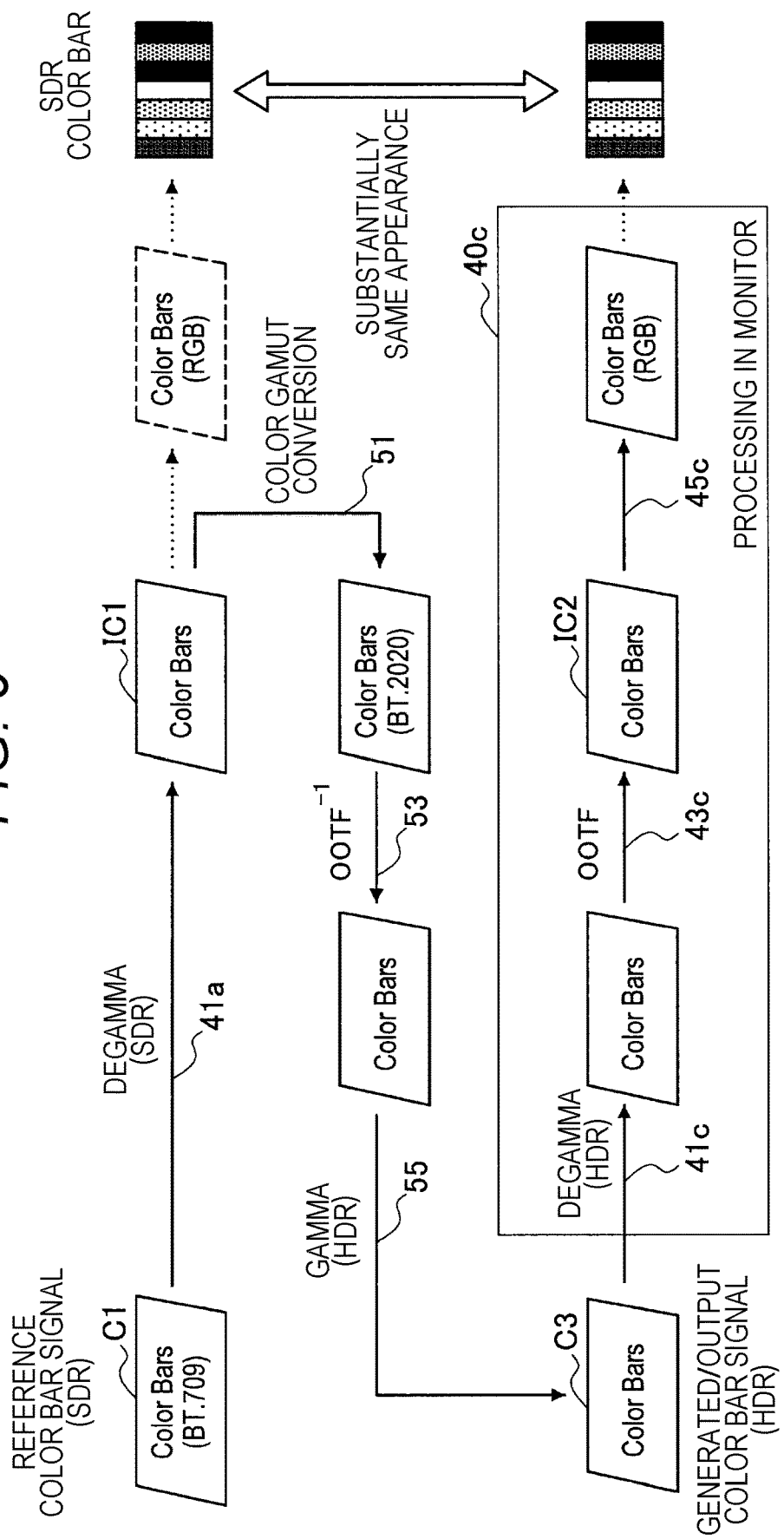
FIG. 6 is an explanatory diagram for describing how another color bar signal can be generated from a reference color bar signal.

FIG. 6 is an explanatory diagram for describing how another color bar signal can be generated from the reference color bar signal. Here, as an example, it is assumed that the reference color bar signal is the color bar signal C1 output to the display device 40a illustrated in FIG. 5, which corresponds to the transfer function for SDR. Furthermore, it is assumed that the color bar signal C3 output to the display device 40c illustrated in FIG. 5 corresponding to the transfer function for HDR is generated from the reference color bar signal C1. The reference color bar signal C1 expresses a reference color bar with BT.709 as the color gamut. The color gamut of the color bar signal C3 is BT.2020.

As illustrated in FIG. 6, the processing of generating the color bar signal C3 from the reference color bar signal C1 includes color gamut conversion 51, inverse OOTF conversion 53, and gamma conversion 55, in addition to the degamma conversion 41a that is also executed in the display device 40a. The color gamut conversion 51 is processing of converting the color gamut from BT.709 to BT.2020. In a case where the color gamut of the reference color bar signal and the color gamut of the output color bar signal are the same, the color gamut conversion 51 is omitted. The inverse OOTF conversion 53 is inverse conversion processing of the OOTF conversion 43c executed in the display device 40c at an output destination. In a case where the OOTF conversion is not executed in the display device, the inverse OOTF conversion 53 is omitted. The gamma conversion 55 is an inverse conversion processing of the degamma conversion 41c executed in the display device 40c at the output destination. The color bar signal C3 is thus generated by applying inverse conversion for canceling effects of signal conversion supposed to be executed in the display device 40c at the output destination to the reference color bar signal C1. An intermediate color bar signal IC2 to be input to the color conversion 45c in the display device 40c that has received the color bar signal C3 will result in a signal substantially equivalent in brightness and color expressed as an intermediate color bar signal IC1 after the degamma conversion 41a for the reference color bar signal C1. In other words, the color bar signal to be provided from the multi-format color bar providing device 30 to each display device 40 is a signal generated by converting the reference color bar signal according to the transfer function of the display device 40 such that the luminance of when the color bar based on the color bar signal is displayed on the display device 40 coincides with the luminance of the reference color bar. In the example in FIG. 6, the color bar displayed on the screen in the display device 40c is viewed in the same manner as the color bar displayed on the screen of the display device 40a on the basis of the reference color bar signal C1.

In an example, the processing of generating another color bar signal from the reference color bar signal may be dynamically executed in response to detection of connection of the display device 40 or an instruction from the user in the multi-format color bar providing device 30. In another example, color bar information that defines one or more other color bar signals calculated according to the above-described principle may be generated in advance in addition to the color bar information that defines the reference color bar signal, and the color bar information may be stored in the multi-format color bar providing device 30. Any color bar corresponding to any transfer function may be selected as the reference color bar from among a plurality of possible transfer functions regardless of the SDR or the HDR. In the example in FIG. 5, the multi-format color bar providing device 30 has the three output interfaces 34, but the multi-format color bar providing device 30 may have any number of output interfaces. The multi-format color bar providing device 30 may have only one output interface, and different color bar signals may be output from the output interface depending on the characteristics of the connected display device.

Two specific embodiments of the multi-format color bar providing device 30 described here will be described in detail in the following sections. In the first embodiment, the multi-format color bar providing device 30 is realized as an imaging device. In the second embodiment, the multi-format color bar providing device 30 is realized as a signal conversion device connected to an imaging device via the input interface 32.

2. FIRST EMBODIMENT

[2-1. Outline of System]

Figure 7:
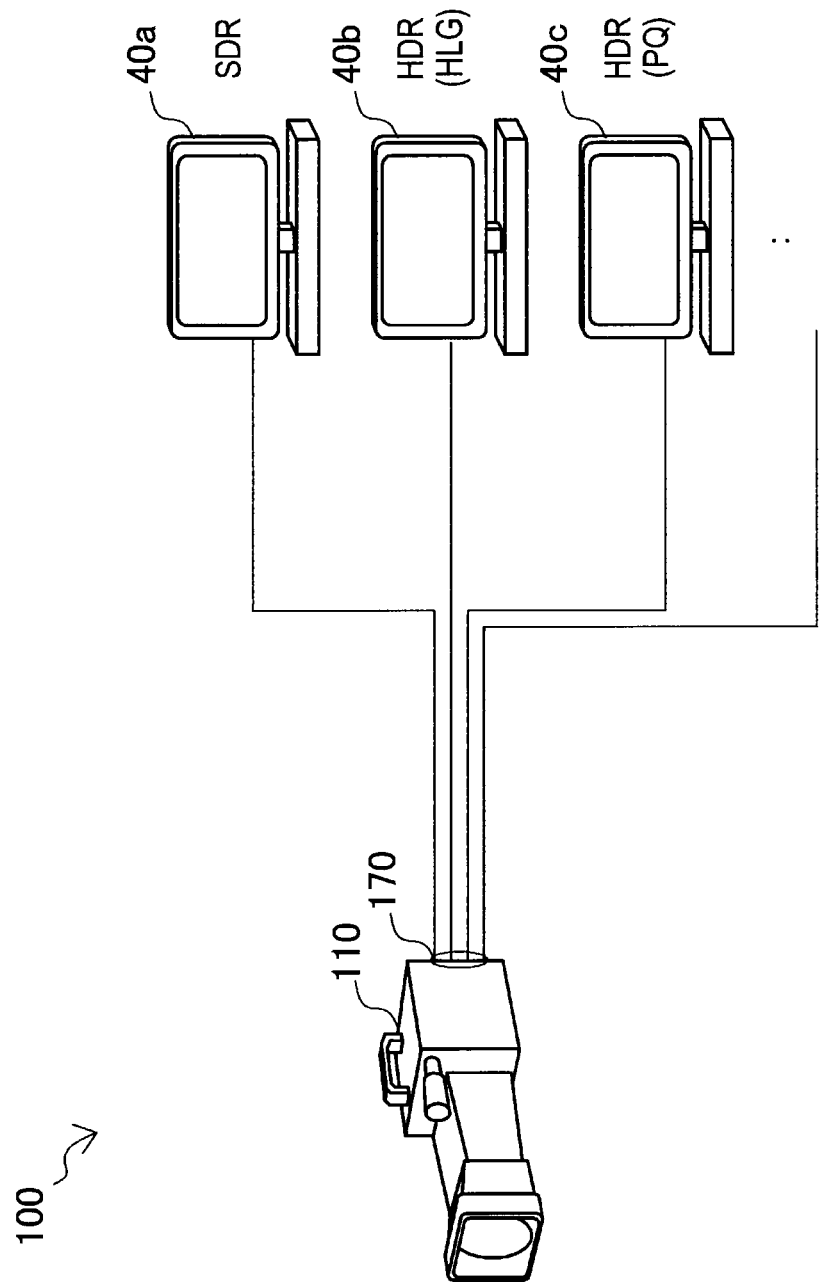
FIG. 7 is an explanatory diagram illustrating an example of a configuration of an image processing system according to a first embodiment.

FIG. 7 illustrates an example of a configuration of an image processing system 100 according to a first embodiment of the technology according to the present disclosure. The image processing system 100 includes an imaging device 110, and one or more display devices 40a, 40b, 40c, and the like. The imaging device 110 is a mode of the multi-format color bar providing device described in the previous section. The imaging device 110 may be, for example, a digital video camera, a digital camcorder, or a digital still camera, or any type of device having a video capturing function. The imaging device 110 includes one or more output interfaces 170, and each of the output interfaces 170 can be connected to one display device 40. The display devices 40a, 40b, and 40c may be monitors that convert input image signals into light with different transfer functions. For example, as described above, the display device 40a displays an SDR video according to BT.1886, and the display device 40b and the display device 40c display HDR videos. Note that these dynamic ranges and transfer function types are merely illustrative examples, and other dynamic ranges or other types of transfer functions may be used by each display device.

[2-2. First Configuration Example of Imaging Device]

In a first configuration example, the imaging device 110 stores in advance at least second color bar information that defines another color bar signal corresponding to a second transfer function, in addition to first color bar information that defines the reference color bar signal corresponding to a first transfer function. Then, the imaging device 110 generates and outputs a color bar signal corresponding to the transfer function used by the display device connected to a certain output interface from any color bar information stored in advance.

(1) Functional Configuration

Figure 8:
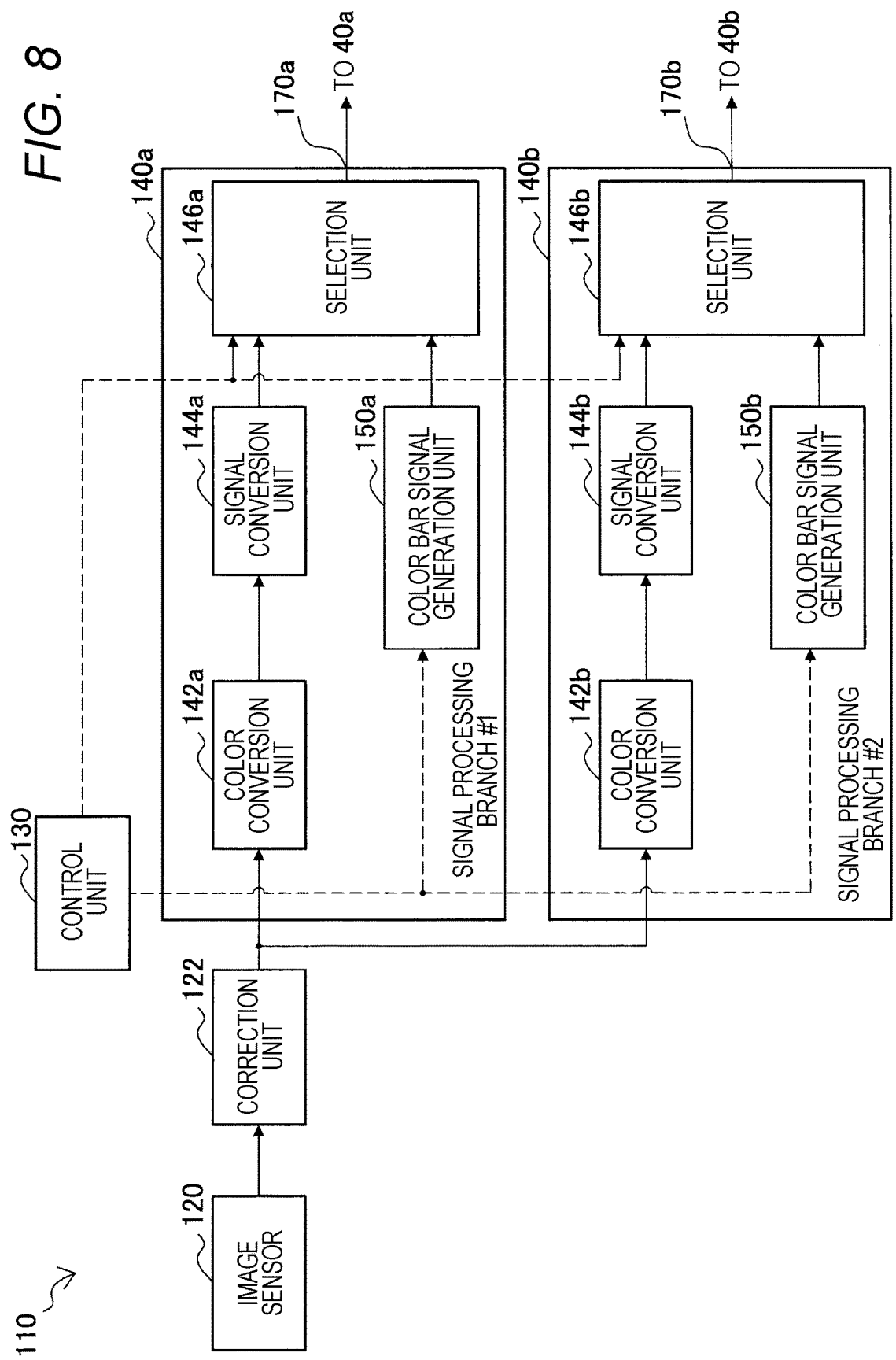
FIG. 8 is a block diagram illustrating a first configuration example of an imaging device according to the first embodiment.

FIG. 8 is a block diagram illustrating the first configuration example of the imaging device 110. Referring to FIG. 8, the imaging device 110 includes an image sensor 120, a correction unit 122, a control unit 130, one or more signal processing branches 140 (140a, 140b, and the like), and one or more output interfaces 170 (170a, 170b, and the like). Each signal processing branch 140 includes color conversion units 142 (142a, 142b, and the like), signal conversion units 144 (144a, 144b, and the like), selection units 146 (146a, 146b, and the like), and color bar signal generation units 150 (150a, 150b, and the like).

The image sensor 120 converts light incident on an imaging surface having an array of imaging elements into an electrical signal to generate an analog image signal, and further converts the analog image signal into a digital image signal. The correction unit 122 executes predetermined signal processing such as defect correction, white balance adjustment, and contrast adjustment, for the digital image signal input from the image sensor 120. The image signal processed by the correction unit 122 (hereinafter referred to as a captured image signal) is distributed to each of the one or more signal processing branches 140.

The control unit 130 controls generation and selection of signals output from the imaging device 110 via the output interfaces 170. The control unit 130 determines, for example, whether or not the display device 40 is connected to each output interface 170. Furthermore, the control unit 130 determines the transfer function to be used in the connected display device 40 among the plurality of transfer functions, for each of the output interfaces 170 that have detected connection of the display devices 40. Moreover, the control unit 130 determines which output mode between the camera mode and the color bar mode has been set, for each of the output interfaces 170.

For example, in a case where it is determined that the camera mode has been set for the output interface 170a, the control unit 130 causes the signal processing branch 140a to process the captured image signal from the correction unit 122 and to output the processed captured image signal from the output interface 170a. More specifically, in a case where color gamut conversion is required for the color gamut to be used in the connected display device 40, the color conversion unit 142a of the signal processing branch 140a converts the color gamut of the captured image signal into the color gamut to be used. The signal conversion unit 144a executes gamma conversion for the captured image signal input from the color conversion unit 142a. The selection unit 146a selects the captured image signal input from the signal conversion unit 144a according to the control of the control unit 130, and outputs the captured image signal to the display device 40a via the output interface 170a. Similarly, in a case where it is determined that the camera mode has been set for the output interface 170b, the control unit 130 causes the signal processing branch 140b to process the captured image signal from the correction unit 122 and to output the processed captured signal from the output interface 170b. Since details of processing in the camera mode in the signal processing branch 140b (and other branches) may be similar to the processing in the signal processing branch 140a, description of the processing is omitted here to avoid redundancy.

In a case where it is determined that the color bar mode has been set for the output interface 170a, the control unit 130 causes the signal processing branch 140a to generate a color bar signal corresponding to the transfer function to be used in the connected display device 40 and to output the generated color bar signal to the display device 40. In the signal processing branch 140a, the color bar signal is generated by the color bar signal generation unit 150a. Then, the selection unit 146a selects the color bar signal input from the color bar signal generation unit 150a according to the control of the control unit 130, and outputs the color bar signal to the display device 40a via the output interface 170a. Similarly, In a case where it is determined that the color bar mode has been set for the output interface 170b, the control unit 130 causes the signal processing branch 140b to generate a color bar signal corresponding to the transfer function to be used in the connected display device 40 and to output the generated color bar signal to the display device 40. Since details of processing in the color bar mode in the signal processing branch 140b (and other branches) may be similar to the processing in the signal processing branch 140a, description of the processing is omitted here to avoid redundancy.

Figure 9:
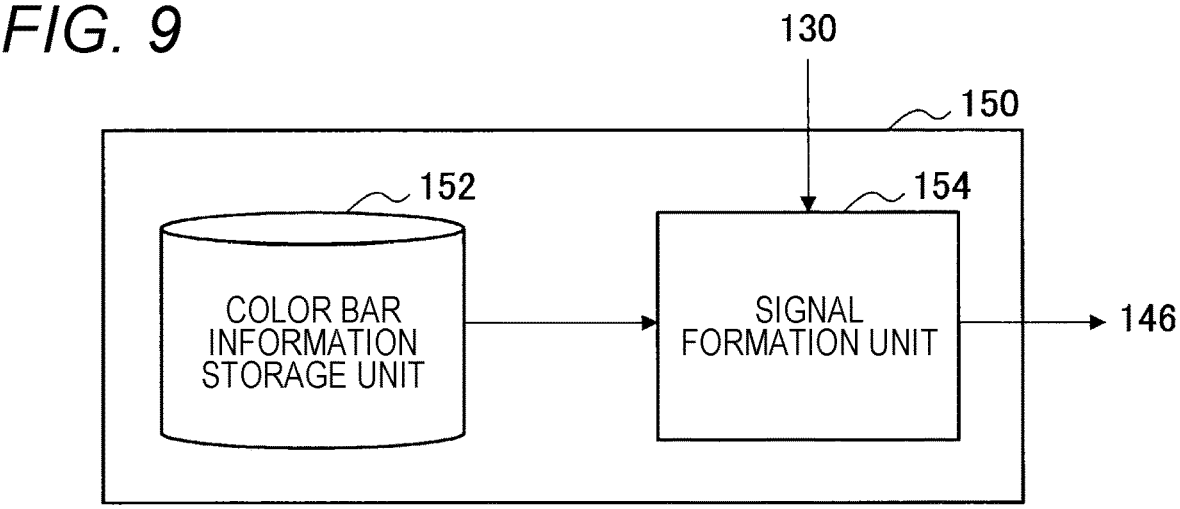
FIG. 9 is a block diagram illustrating an example of a detailed configuration of a color bar signal generation unit illustrated in FIG. 8.

FIG. 9 is a block diagram illustrating an example of a detailed configuration of a color bar signal generation unit illustrated in FIG. 8. Referring to FIG. 9, the color bar signal generation unit 150 includes a color bar information storage unit 152 and a signal formation unit 154. The color bar information storage unit 152 stores color bar information that defines color bar signals each corresponding to a plurality of transfer function candidates. The first color bar information defines a color bar signal corresponding to the first transfer function. The second color bar information defines a color bar signal corresponding to the second transfer function. The n-th color bar information defines a color bar signal corresponding to the n-th transfer function. For example, the first transfer function may be a transfer function corresponding to a first dynamic range, and the second transfer function may be a transfer function corresponding to a second dynamic range wider than the first dynamic range. Alternatively, the first transfer function may have a first gamma curve and the second transfer function may have a second gamma curve different from the first gamma curve.

Figure 10:
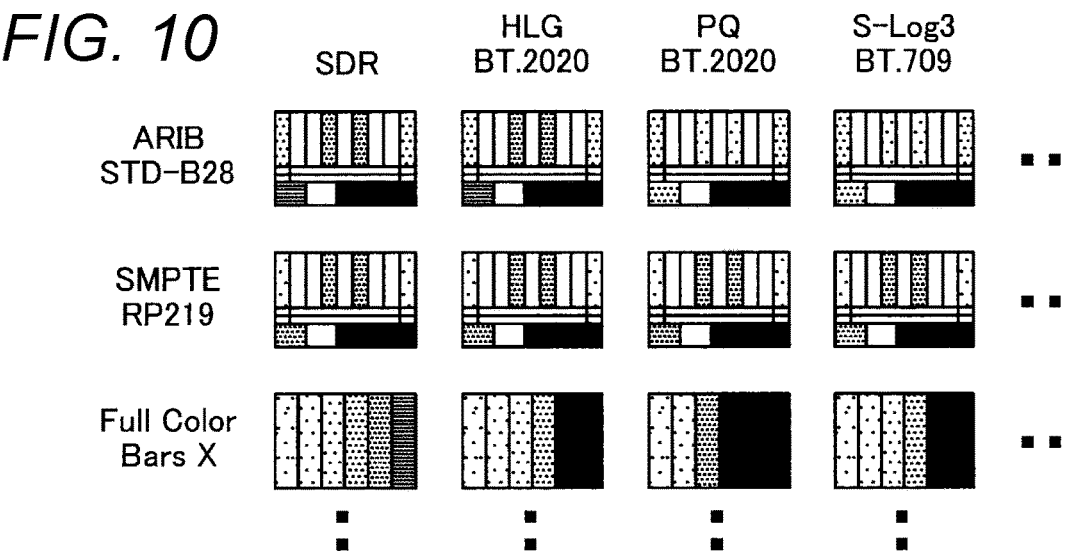
FIG. 10 is an explanatory diagram for describing a first example of a configuration of color bar information stored by a storage unit illustrated in FIG. 9.

FIG. 10 is an explanatory diagram for describing a first example of a configuration of the color bar information stored by the color bar information storage unit 152. In the first example, the color bar information is a set of pieces of image information expressing respective color bars. FIG. 10 illustrates a set of three types of color bar images for SDR display, a set of three types of color bar images for the combination of HLG and BT.2020, a set of three types of color bar images for the combination of PQ and BT.2020, and a set of three types of color bar images for the combination of S-Log 3 and BT.709. One of these sets (typically a set for SDR display) is a set of reference color bar images. Meanwhile, a color bar image included in another set is a color bar image that is a result of applying inverse conversion for canceling effects of signal conversion supposed to be executed in a monitor according to a corresponding transfer function to the reference color bar image. The three types of color bar images may be, for example, an ARIB STD-B28 color bar, an SMPTE RP 219 color bar, and a full color bar. Note that the color bar image not the reference color bar can have a color component value different from a color component value defined in the specification in that the above-described inverse conversion has been applied.

In a case where the color bar information has the first configuration described using FIG. 10, the signal formation unit 154 reads the color bar information corresponding to the transfer function (determined to be used by the connected display device 40) given in instruction by the control unit 130 from the color bar information storage unit 152. Then, the signal formation unit 154 forms a color bar signal to be output on the basis of the read color bar information. The color bar signal formed by the signal formation unit 154 is output to the selection unit 146.

Figure 11:
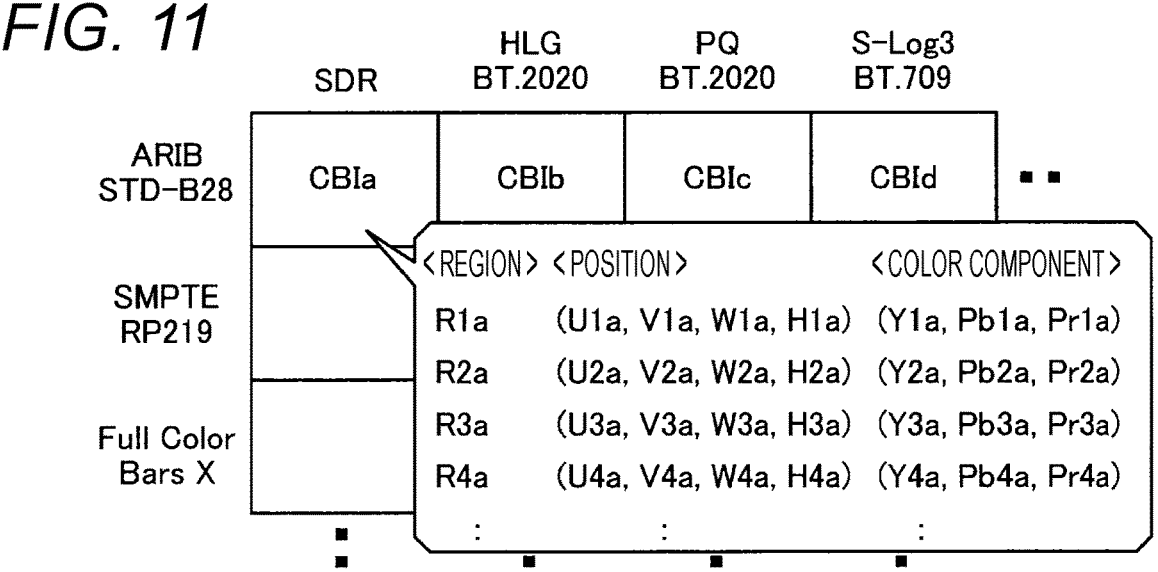
FIG. 11 is an explanatory diagram for describing a second example of the configuration of the color bar information stored by the storage unit illustrated in FIG. 9.

FIG. 11 is an explanatory diagram for describing a second example of the configuration of the color bar information stored by the color bar information storage unit 152. In the second example, the color bar information is a set of definition data that define structures of respective color bars. FIG. 11 illustrates that the color bar information includes definition data CBIa that defines the structure of the ARIB STD-B28 color bar for SDR display, definition data CBIb that defines the structure of the ARIB STD-B28 color bar for the combination of HLG and BT.2020, definition data CBIc that defines the structure of the ARIB STD-B28 color bar for the combination of PQ and BT.2020, and definition data CBId that defines the structure of the ARIB STD-B28 color bar for the combination of S-Log 3 and BT.709, and the like. More specifically, the definition data CBIa can include positions and color component values of a plurality of regions (a plurality of rectangular regions of the color bar 10 illustrated in FIG. 4) configuring the ARIB STD-B28 color bar. For example, the position of the i-th region $Ri_a$ is defined by top left vertex coordinates ($Ui_a$, $Vi_a$), a width (Wi$_a$), and a height (Hi$_a$), and the color components of the i-th region Ri$_a$ can be defined by three color component values (Yi$_a$, Pbi$_a$, Pri$_a$). A similar rule applies to other definition data. Also in the second example, definition data for SDR display directly defines the structure of the reference color bar image, for example. Meanwhile, the definition data for the combination of another transfer function and the color gamut defines a structure of a color bar image that is a result of applying inverse conversion for canceling effects of signal conversion supposed to be executed in a monitor according to a corresponding transfer function to the reference color bar image.

In a case where the color bar information has the second configuration described using FIG. 11, the signal formation unit 154 reads the definition data that defines the structure of the color bar corresponding to the transfer function (determined to be used by the connected display device 40) given in instruction by the control unit 130 from the color bar information storage unit 152. Then, the signal formation unit 154 forms a color bar signal to be output by drawing an image according to the definition data. The color bar signal formed by the signal formation unit 154 is output to the selection unit 146.

Note that the combinations of the transfer functions and the color gamuts presented in connection with FIGS. 10 and 11 are merely examples. The color bar information storage unit 152 may store color bar information corresponding to any combination of a transfer function and a color gamut. The types of color bars mentioned here are also merely examples.

The control unit 130 may perform one or more of the following determinations on the basis of a user input detected via the user interface (not illustrated). In general, the control unit 130 (and other control units to be described below) may be expressed as a determination unit.

a) whether or not a display device is connected to each output interface b) the transfer function to be used in the connected display device, for each output interface to which the display device is connected c) the color gamut to be used in the connected display device, for each output interface to which the display device is connected d) the output mode (camera mode or color bar mode) for each output interface to which the display device is connected e) the type of color bar that the user wishes to display The user interface may be a physical input device such as a touch panel, a button, or a switch provided on a housing of the imaging device 110. Alternatively, the user interface may be provided as a graphical user interface (GUI) on a device remotely connected via a communication interface. Furthermore, the control unit 130 may perform one or more determinations listed above on the basis of control information received via the output interface 170 from the display device 40.

(2) Flow of Signal for Each Output Mode

Figure 12:
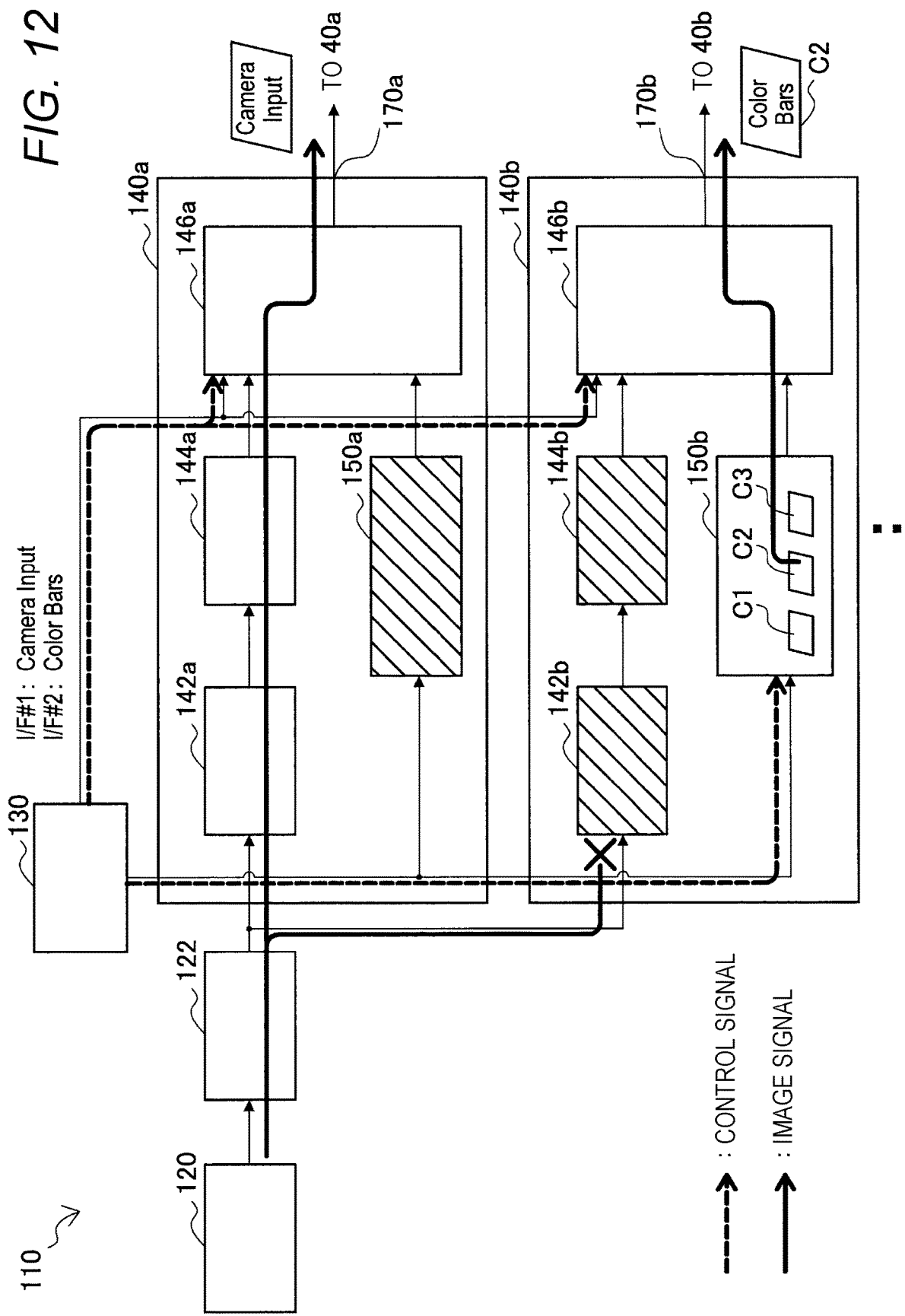
FIG. 12 is an explanatory diagram for describing selection of an output signal in the imaging device illustrated in FIG. 8.

FIG. 12 is an explanatory diagram for describing selection of an output signal in the imaging device illustrated in FIG. 8. Referring to FIG. 12, an arrow representing a flow of a signal in one scenario is superimposed on a block diagram similar to FIG. 8. A solid arrow represents a flow of an image signal that can be the captured image signal or the color bar signal, and a broken line arrow represents a flow of a control signal. In the present scenario, it is assumed that the camera mode is set for the output interface 170a and the color bar mode is set for the output interface 170b. Furthermore, it is assumed that the display device 40b is connected to the output interface 170b. The control unit 130 turns on the color conversion unit 142a and the signal conversion unit 144a in the signal processing branch 140a, and causes the selection unit 146a to output the captured image signal processed through these processing blocks via the output interface 170a. The color bar signal generation unit 150a is turned off. Meanwhile, the control unit 130 turns on the color bar signal generation unit 150b in the signal processing branch 140b, causes the color bar signal generation unit 150b to generate the color bar signal C2 corresponding to the transfer function used in the display device 40b, and causes the selection unit 146b to output the color bar signal C2 via the output interface 170b. The color conversion unit 142b and the signal conversion unit 144b are turned off.

Note that FIG. 12 illustrates a scenario in which different output modes are set for two branches as an example for comparison. However, as a matter of course, the same output mode may be set for two branches as in scenarios in FIGS. 16A and 16B to be described below. In a case where the color bar mode is set for both of two branches, even if the signal transfer characteristics of the display devices 40 connected to the branches are different, the color bar signals predefined to cancel the effects of the transfer functions to be each used are provided to the display devices 40, and thus how the color bars look on the screens of the two display devices 40 becomes substantially equivalent, as a result.

(3) Flow of Processing

Figure 13:
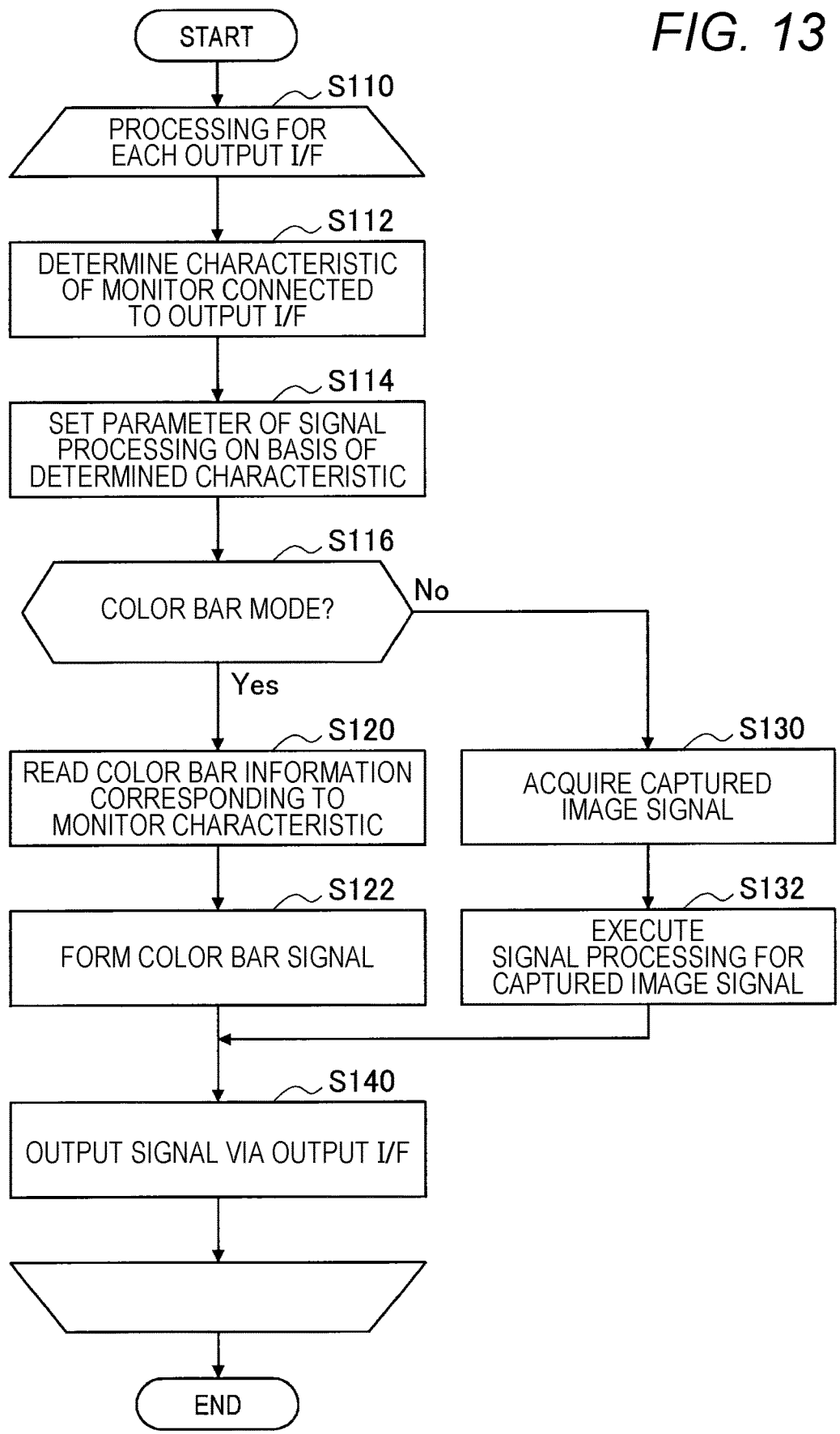
FIG. 13 is a flowchart illustrating an example of a flow of image processing executed by the imaging device according to the first configuration example.

FIG. 13 is a flowchart illustrating an example of a flow of image processing executed by the imaging device 110 according to the first configuration example. Although a plurality of processing steps is described in the present flowchart, these processing steps do not necessarily have to be executed in the illustrated order. Some processing steps may be executed in parallel. Furthermore, additional processing steps may be employed and some processing steps may be omitted.

The image processing illustrated in FIG. 13 is executed for each of the one or more output interfaces 170 included in the imaging device 110 (step S110).

First, the control unit 130 determines the signal transfer characteristic of the display device 40 connected to the output interface 170 (step S112). The signal transfer characteristic of the display device 40 may be determined on the basis of a user input or may be determined on the basis of the control information received from the display device 40.

Next, the control unit 130 sets parameters of the signal processing branch 140 on the basis of the determined signal transfer characteristic (step S114). For example, the control unit 130 may set a gamma curve to be used by the signal conversion unit 144 of the signal processing branch 140 in the camera mode. Furthermore, the control unit 130 may set color conversion to be applied to the image signal by the color conversion unit 142. Furthermore, the control unit 130 may set which color bar signal corresponding to which transfer function the color bar signal generation unit 150a should generate in the color bar mode.

Next, the control unit 130 determines the set output mode between the camera mode and the color bar mode (step S116). The output mode may be determined on the basis of the user input or may be determined on the basis of the control information received from the display device 40. In a case where the output mode is the color bar mode, the processing proceeds to step S120. Meanwhile, in a case where the output mode is the camera mode, the processing proceeds to step S130.

In the color bar mode, the signal formation unit 154 of the color bar signal generation unit 150 reads the color bar information corresponding to the characteristic of the display device 40 from the color bar information storage unit 152 according to the setting by the control unit 130 (step S120). Next, the signal formation unit 154 forms a color bar signal to be output on the basis of the read color bar information (step S122).

Meanwhile, in the camera mode, the signal processing branch 140 acquires the captured image signal from the correction unit 122 (step S130). Next, in the signal processing branch 140, color conversion by the color conversion unit 142 and gamma conversion by the signal conversion unit 144 are executed for the captured image signal (step S132).

Then, the selection unit 146 outputs the color bar signal formed by the signal formation unit 154 in the color bar mode, or the captured image signal after color conversion and gamma conversion in the camera mode, to the display device 40 via the output interface 170 (step 1240).

[2.3. Second Configuration Example of Imaging Device]

In a second configuration example, the imaging device 110 stores in advance the first color bar information that defines the color bar signal corresponding to the first transfer function. The color bar signal corresponding to the first transfer function is the reference color bar signal. The first color bar information is referred to as the reference color bar information. Then, the imaging device 110 dynamically generates the color bar signal corresponding to the transfer function determined to be used in the display device 40 connected to each output interface 170 from the reference color bar information.

(1) Functional Configuration

Figure 14:
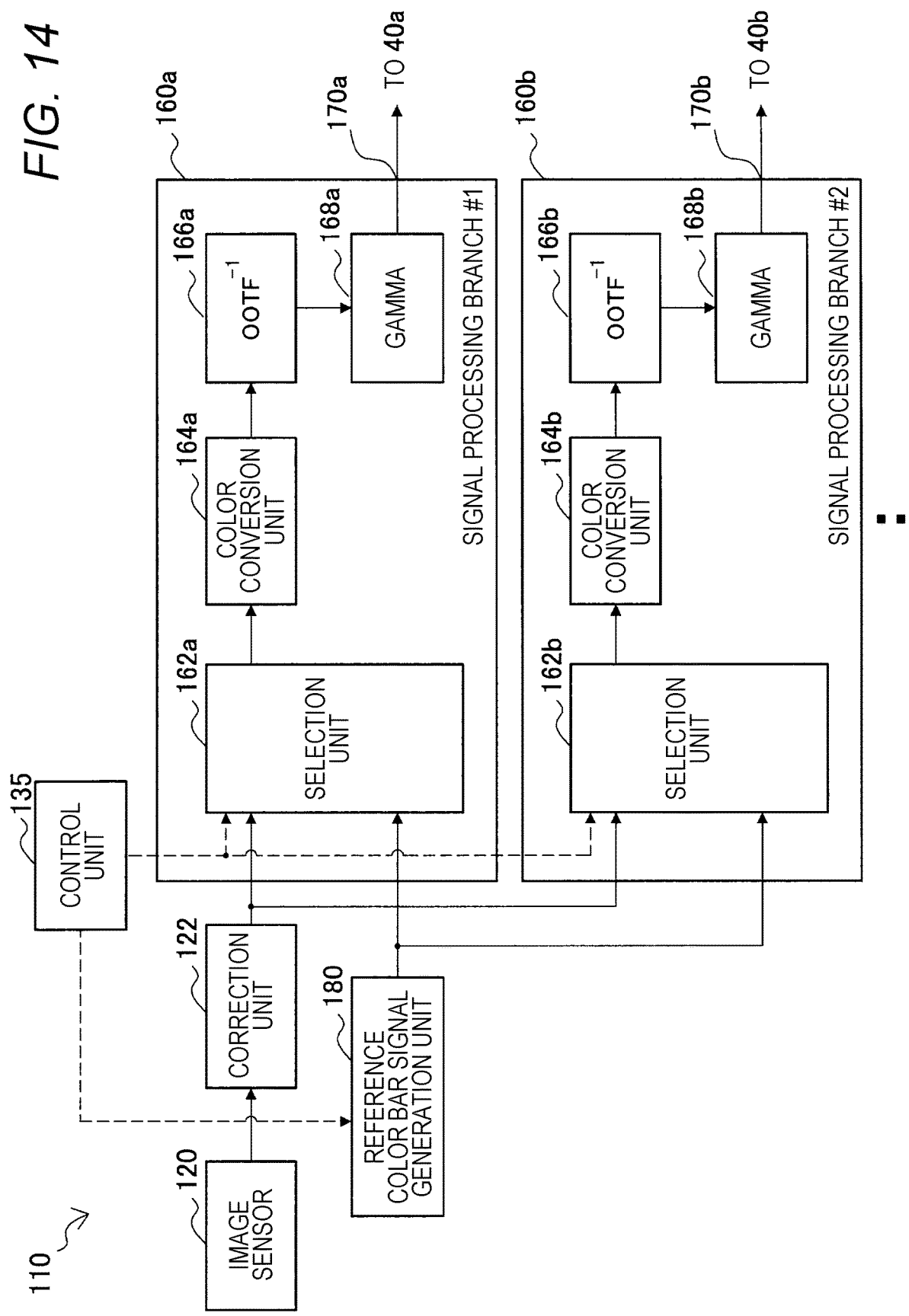
FIG. 14 is a block diagram illustrating a second configuration example of the imaging device according to the first embodiment.

FIG. 14 is a block diagram illustrating the second configuration example of the imaging device 110. Referring to FIG. 14, the imaging device 110 includes the image sensor 120, the correction unit 122, a control unit 135, one or more signal processing branches 160 (160a, 160b, and the like), the one or more output interfaces 170 (170a, 170b, and the like), and a reference color bar signal generation unit 180. Each signal processing branch 160 includes selection units 162 (162a, 162b, and the like), color conversion units 164 (164a, 164b, and the like), an inverse OOTF conversion units 166 (166a, 166b, and the like), and a gamma conversion units 168 (168a, 168b, and the like).

In the second configuration example, the control unit 135 controls generation and selection of signals output from the imaging device 110 via the output interfaces 170. The control unit 135 determines, for example, whether or not the display device 40 is connected to each output interface 170. Furthermore, the control unit 135 determines the transfer function to be used in the connected display device 40 among the plurality of transfer functions, for each of the output interfaces 170 that have detected connection of the display devices 40. Moreover, the control unit 135 determines which output mode between the camera mode and the color bar mode has been set, for each of the output interfaces 170. Each of these determinations may be made on the basis of the user input detected through the user interface or may be made on the basis of the control information received from the display device 40 as in the first configuration example.

For example, in a case where it is determined that the camera mode has been set for the output interface 170a, the control unit 135 causes the signal processing branch 160a to process the captured image signal from the correction unit 122 and to output the processed captured image signal from the output interface 170a. More specifically, the selection unit 162a of the signal processing branch 160a selects the captured image signal input from the correction unit 122 according to the control of the control unit 135, and outputs the captured image signal to the color conversion unit 164a. The color conversion unit 164a converts the color space of the captured image signal from the RGB space to the YPbPr space. Furthermore, in a case where color gamut conversion is required for the color gamut to be used in the connected display device 40, the color conversion unit 164a converts the color gamut of the captured image signal into the color gamut to be used. The inverse OOTF conversion unit 166a is turned off in the camera mode, and simply passes the captured image signal to the gamma conversion unit 168a. The gamma conversion unit 168a executes gamma conversion for the captured image signal processed by the color conversion unit 164a. Then, the gamma conversion unit 168a outputs the captured image signal to the display device 40 via the output interface 170a. Similarly, in a case where it is determined that the camera mode has been set for the output interface 170b, the control unit 135 causes the signal processing branch 160b to process the captured image signal from the correction unit 122 and to output the processed captured image signal from the output interface 170b. Since details of processing in the camera mode in the signal processing branch 160b (and other branches) may be similar to the processing in the signal processing branch 160a, description of the processing is omitted here to avoid redundancy.

In a case where it is determined that the color bar mode has been set for the output interface 170a, the control unit 135 causes the signal processing branch 160a to generate a color bar signal corresponding to the transfer function to be used in the connected display device 40 and to output the generated color bar signal to the display device 40. In the second configuration example, a color bar signal generation unit is substantially configured by the reference color bar signal generation unit 180 and partial processing blocks of each signal processing branch 160. Here, the partial processing block may be, for example, one or more of the color conversion unit 164, the inverse OOTF conversion unit 166, and the gamma conversion unit 168. In other words, in the second configuration example, color bar signals corresponding to the respective transfer functions are generated through signal conversion using the circuit of the signal processing branch 160 shared between the two output modes from the reference color bar signal generated by the reference color bar signal generation unit 180.

Figure 15:
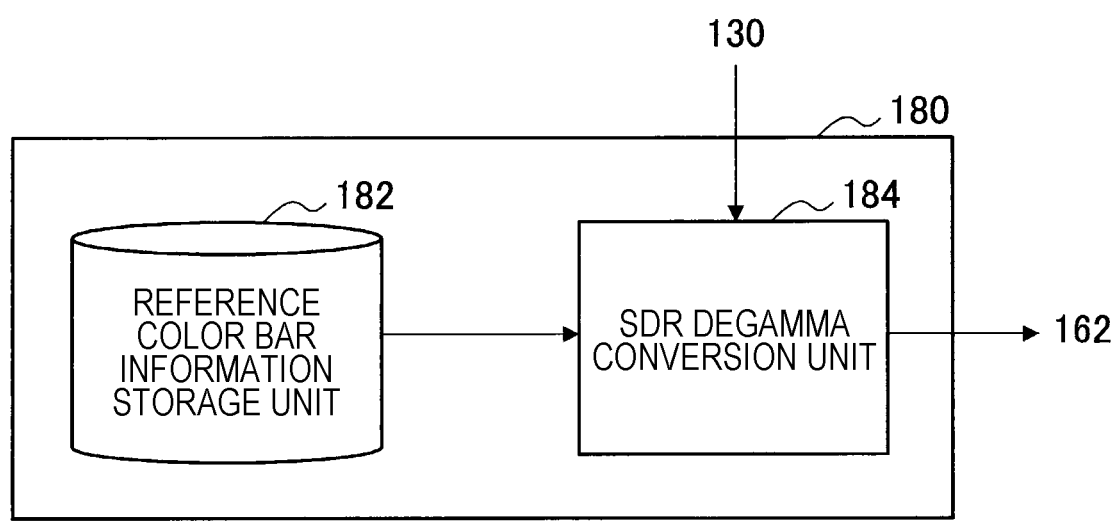
FIG. 15 is a block diagram illustrating an example of a detailed configuration of a reference color bar signal generation unit illustrated in FIG. 14.

FIG. 15 is a block diagram illustrating an example of a detailed configuration of a reference color bar signal generation unit illustrated in FIG. 14. Referring to FIG. 15, the reference color bar signal generation unit 180 includes a reference color bar information storage unit 182 and an SDR degamma conversion unit 184. The reference color bar information storage unit 182 stores reference color bar information that defines a reference color bar signal corresponding to one of a plurality of transfer function candidates. The reference color bar information storage unit 182 may store a set of pieces of image information expressing reference color bars as the reference color bar information, as in the first example of the configuration of the color bar information illustrated in FIG. 10. The reference color bar is typically an existing color bar designed on the premise of SDR display. Thus, the reference color bar information storage unit 182 can store, for example, image information of the ARIB STD-B28 color bar, the SMPTE RP 219 color bar, and the full color bar for SDR display. Alternatively, the reference color bar information storage unit 182 may store a set of definition data that define the structures of the reference color bars as the reference color bar information, as in the second example of the configuration of the color bar information illustrated in FIG. 11. The SDR degamma conversion unit 184 forms a reference color bar signal on the basis of the reference color bar information read from the reference color bar information storage unit 182, and executes degamma conversion for the reference color bar signal. The degamma conversion here is processing corresponding to the degamma conversion 41*a* illustrated in FIG. 6. The SDR degamma conversion unit 184 may execute degamma conversion with a gamma value given in instruction by the control unit 135 among a plurality of gamma values (for example, 2.2, 2.4, or 2.6). Then, the SDR degamma conversion unit 184 outputs the reference color bar signal after degamma conversion to one or more signal processing branches 160.

Referring back to FIG. 14 and returning to description of the case where the color bar mode is set for the output interface 170*a*, the selection unit 162*a* of the signal processing branch 160*a* selects the reference color bar signal input from the reference color bar signal generation unit 180 according to the control of the control unit 135, and outputs the reference color bar signal to the color conversion unit 164*a*. In a case where color gamut conversion is required for the color gamut to be used in the connected display device 40, the color conversion unit 164*a* converts the color gamut of the reference color bar signal into the color gamut to be used. In a case where the transfer function to be used in the connected display device 40 includes the OOTF, the inverse OOTF conversion unit 166*a* applies the inverse conversion processing of the OOTF conversion to the reference color bar signal. The gamma conversion unit 168*a* executes, for the reference color bar signal, gamma conversion with the inverse function of the transfer function to be used in the connected display device 40, and generates a color bar signal corresponding to the transfer function. Then, the gamma conversion unit 168*a* outputs the generated color bar signal to the display device 40 via the output interface 170*a*. Similarly, in a case where it is determined that the color bar mode has been set for the output interface 170*b*, the control unit 135 causes the signal processing branch 160*b* to process the reference color bar signal from the reference color bar signal generation unit 180 and to output the generated color bar signal from the output interface 170*b*. Since details of processing in the color bar mode in the signal processing branch 160*b* (and other branches) may be similar to the processing in the signal processing branch 160*a*, description of the processing is omitted here to avoid redundancy.

In the second configuration example, the reference color bar signal defined by the reference color bar information is typically a prespecified signal corresponding to the first transfer function. Another color bar signal dynamically generated from the reference color bar signal through signal conversion corresponds to a transfer function different from the first transfer function. For example, the first transfer function may be a transfer function corresponding to a first dynamic range, and the another transfer function may be a transfer function corresponding to a second dynamic range wider than the first dynamic range. Alternatively, the first transfer function may have a first gamma curve, and the another transfer function may have another gamma curve different from the first gamma curve.

(2) Flow of Signal for Each Output Mode

FIG. 16A is a first explanatory diagram for describing selection of an output signal in the imaging device illustrated in FIG. 14. Unlike the scenario illustrated in FIG. 12, it is assumed here that the camera mode is set for both the output interface 170*a* and the output interface 170*b*. The control unit 135 causes the selection unit 162*a* to select the captured image signal in the signal processing branch 160*a*. Then, the control unit 135 turns on the processing blocks except the inverse OOTF conversion unit 166*a* in the signal processing branch 160*a*, and causes the captured image signal processed through these processing blocks to be output via the output interface 170*a*. Similarly, the control unit 135 causes the selection unit 162*b* to select the captured image signal in the signal processing branch 160*b*. Then, the control unit 135 turns on the processing blocks except the inverse OOTF conversion unit 166*b* in the signal processing branch 160*b*, and causes the captured image signal processed through these processing blocks to be output via the output interface 170*b*. In a case where the signal transfer characteristics of the display devices each connected to the output interfaces 170*a* and 170*b* are different, the captured image signals output from the interfaces have different signal values as a result of applying different signal conversions. In a case where there is no output interface 170 for which the color bar mode has been set, the reference color bar signal generation unit 180 is turned off.

FIG. 16B is a second explanatory diagram for describing selection of an output signal in the imaging device illustrated in FIG. 14. Unlike the scenario illustrated in FIGS. 12 and 16A, it is assumed here that the color bar mode is set for both the output interface 170*a* and the output interface 170*b*. The control unit 135 causes the selection unit 162*a* to select the reference color bar signal from the reference color bar signal generation unit 180 in the signal processing branch 160*a*. Then, the control unit 135 turns on all the processing blocks in the signal processing branch 160*a*, and causes the color bar signal corresponding to the transfer function to be used in the connected display device to be generated from the reference color bar signal according to the principle described using FIG. 6. The generated color bar signal is output via the output interface 170*a*. In the example in FIG. 16B, the color bar signal C1 is output via the output interface 170*a*. Similarly, the control unit 135 causes the selection unit 162*b* to select the reference color bar signal from the reference color bar signal generation unit 180 in the signal processing branch 160*b*. Then, the control unit 135 turns on all the processing blocks in the signal processing branch 160*b*, and causes the color bar signal corresponding to the transfer function to be used in the connected display device to be generated from the reference color bar signal according to the principle described using FIG. 6. The generated color bar signal is output via the output interface 170*b*. In the example in FIG. 16B, the color bar signal C2 is output via the output interface 170*b*. As described above, how the color bars displayed on the screens of the display devices 40 look on the basis of the color bar signals, as a result of applying the signal conversion for canceling effects of transfer functions to be used by the display devices at the output destination to the reference color bar signal by the signal processing branches 160, becomes substantially equivalent. In a case where there is no output interface 170 for which the camera mode has been set, the image sensor 120 and the correction unit 122 can be turned off.

Note that, as a matter of course, different output modes may be set for two or more branches in other scenarios.

(3) Flow of Processing

Figure 17:
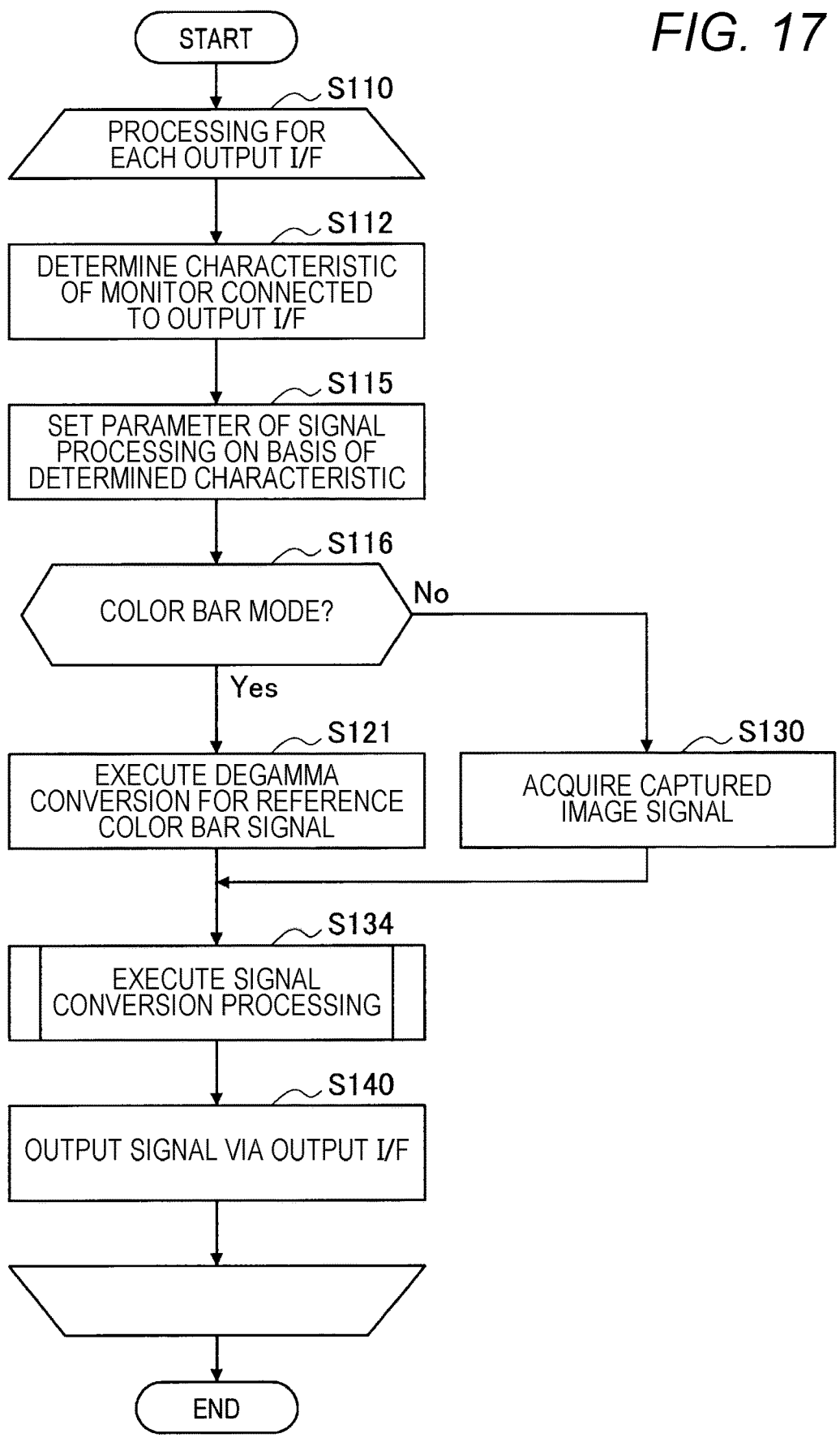
FIG. 17 is a flowchart illustrating an example of a flow of image processing executed by the imaging device according to the second configuration example.

FIG. 17 is a flowchart illustrating an example of a flow of image processing executed by the imaging device 110 according to the second configuration example. Although a plurality of processing steps is described in the present flowchart, these processing steps do not necessarily have to be executed in the illustrated order. Some processing steps may be executed in parallel. Furthermore, additional processing steps may be employed and some processing steps may be omitted.

The image processing illustrated in FIG. 17 is executed for each of the one or more output interfaces 170 included in the imaging device 110 (step S110).

First, the control unit 135 determines the signal transfer characteristic of the display device 40 connected to the output interface 170 (step S112). The signal transfer characteristic of the display device 40 may be determined on the basis of a user input or may be determined on the basis of the control information received from the display device 40.

Next, the control unit 135 sets parameters of the signal processing branch 160 on the basis of the determined signal transfer characteristic (step S115). For example, the control unit 135 may set a gamma curve to be used by the gamma conversion unit 168 of the signal processing branch 160. Furthermore, the control unit 135 may set color conversion to be applied to the image signal by the color conversion unit 164. Furthermore, the control unit 135 may set a gamma curve to be used by the SDR degamma conversion unit 184 of the reference color bar signal generation unit 180. Furthermore, the control unit 135 may set a tone curve to be used by the inverse OOTF conversion unit 166.

Next, the control unit 135 determines the set output mode between the camera mode and the color bar mode (step S116). The output mode may be determined on the basis of the user input or may be determined on the basis of the control information received from the display device 40. In a case where the output mode is the color bar mode, the processing proceeds to step S121. Meanwhile, in a case where the output mode is the camera mode, the processing proceeds to step S130.

In the color bar mode, the SDR degamma conversion unit 184 executes degamma conversion for the reference color bar signal formed on the basis of the reference color bar information (step S121).

Meanwhile, in the camera mode, the signal processing branch 160 acquires the captured image signal from the correction unit 122 (step S130).

Next, in the signal processing branch 160, signal conversion processing is executed for an image signal selected by the selection unit 162 from the reference color bar signal and the captured image signal (step S134). The signal conversion processing executed here will be described in more detail below.

Then, the color bar signal after signal conversion in the color bar mode or the captured image signal after signal conversion in the camera mode is output to the display device 40 via the output interface 170 (step S140).

Figure 18:
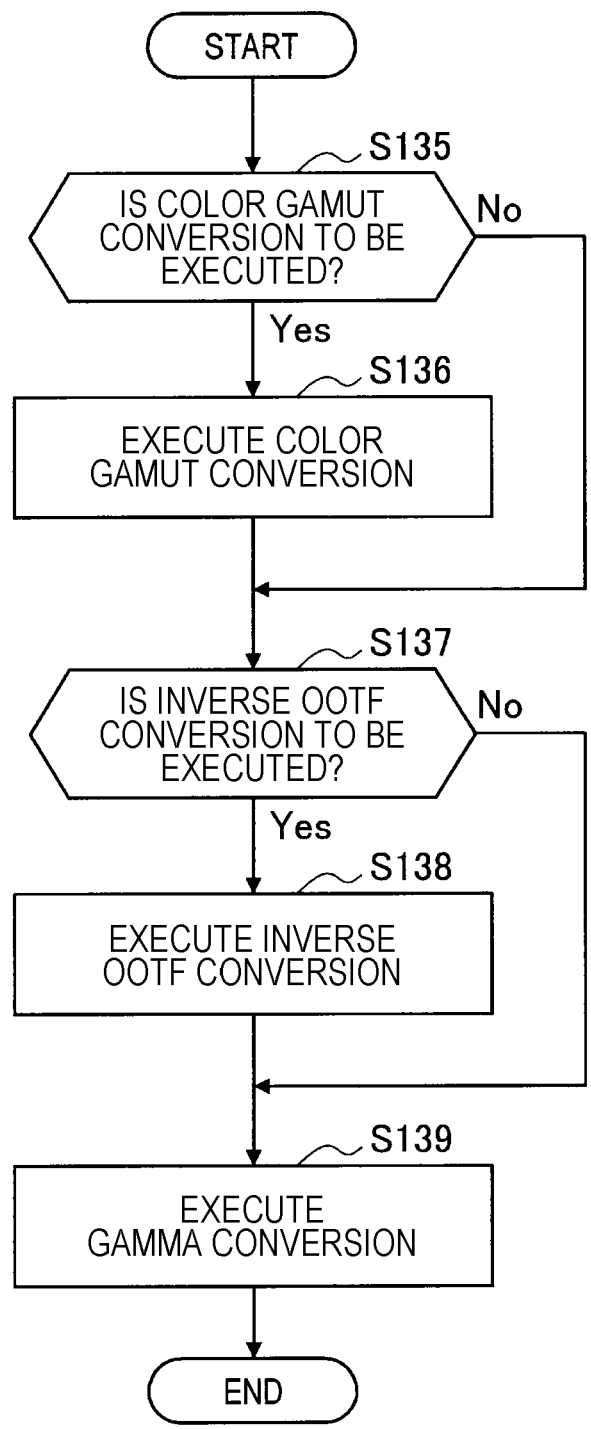
FIG. 18 is a flowchart illustrating an example of a more detailed flow of signal conversion processing illustrated in FIG. 17.

FIG. 18 is a flowchart illustrating an example of a more detailed flow of signal conversion processing illustrated in FIG. 17. The signal conversion processing illustrated in FIG. 18 is performed for the image signal selected by the selection unit 162, of the reference color bar signal and the captured image signal.

First, in a case where the control unit 135 determines that the color gamut conversion should be performed (step S135), the color conversion unit 164 executes color gamut conversion for converting the color gamut of the image signal into a set color gamut (step S136). Furthermore, in a case where the control unit 135 determines that the inverse OOTF conversion should be performed (step S137), the inverse OOTF conversion unit 166 executes the inverse OOTF conversion for applying the inverse function of the OOTF to the image signal (step S138). Then, the gamma conversion unit 168 executes gamma conversion using the gamma curve set by the control unit 135 (step S139).

3. SECOND EMBODIMENT

[3-1. Outline of System]

Figure 19:
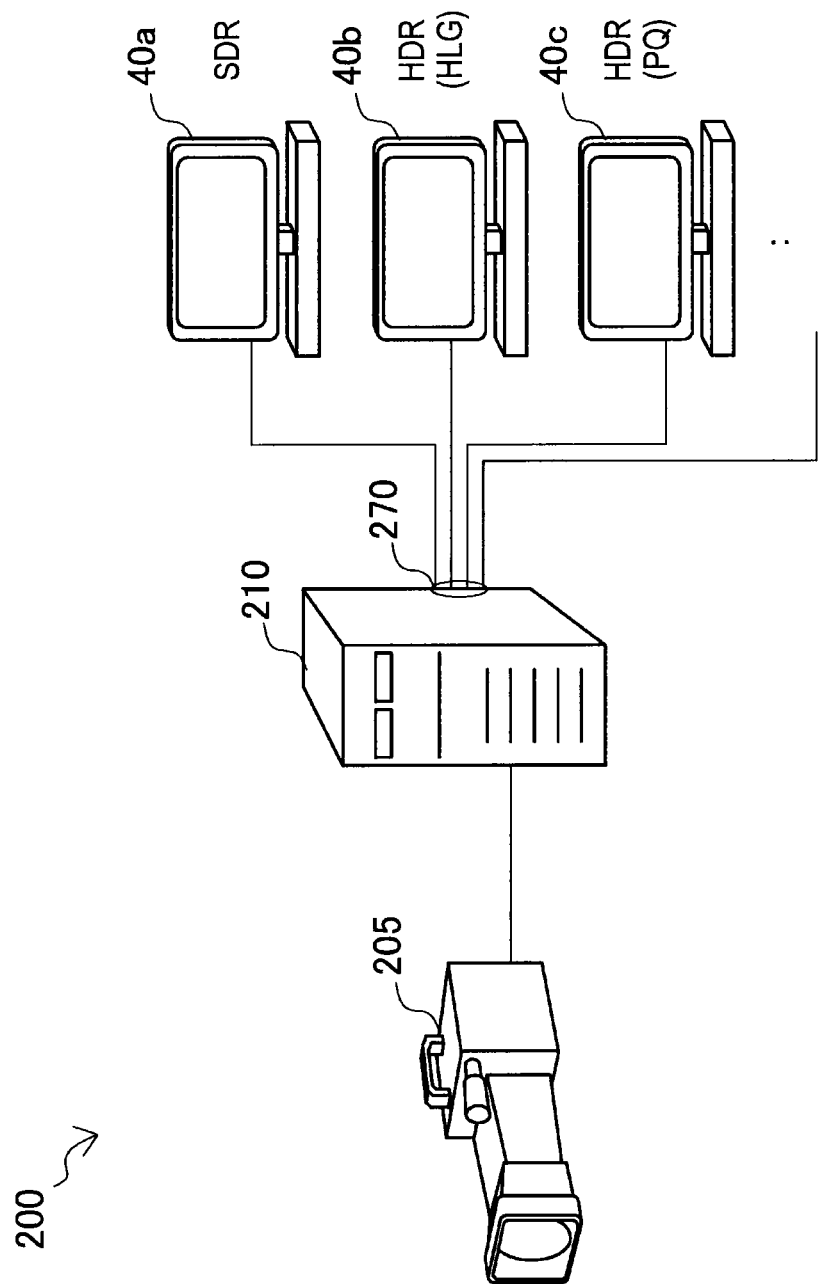
FIG. 19 is an explanatory diagram illustrating an example of a configuration of an image processing system according to a second embodiment.

FIG. 19 illustrates an example of a configuration of an image processing system 200 according to a second embodiment of the technology according to the present disclosure. The image processing system 200 includes an imaging device 205, a signal conversion device 210, and one or more display devices 40a, 40b, 40c, and the like. The imaging device 205 is a signal source that provides a content signal as an image signal that expresses video content to the signal conversion device 210. The image processing system 200 may include, as a signal source, a data server storing video content, a receiver that receives and relays a content signal from outside the system, or the like, instead of the imaging device 205. A plurality of signal sources may be connected to the signal conversion device 210. The signal conversion device 210 is a mode of a multi-format color bar providing device described above. The signal conversion device 210 includes one or more output interfaces 270, and each of the output interfaces 270 can be connected to one display device 40.

[3-2. First Configuration Example of Signal Conversion Device]

In the first configuration example, the signal conversion device 210 stores in advance at least second color bar signal that defines another color bar signal corresponding to a second transfer function, in addition to first color bar information that defines the reference color bar signal corresponding to a first transfer function. Then, the signal conversion device 210 generates and outputs a color bar signal corresponding to a transfer function to be used by the display device connected to a certain output interface from any color bar information stored in advance.

(1) Functional Configuration

Figure 20:
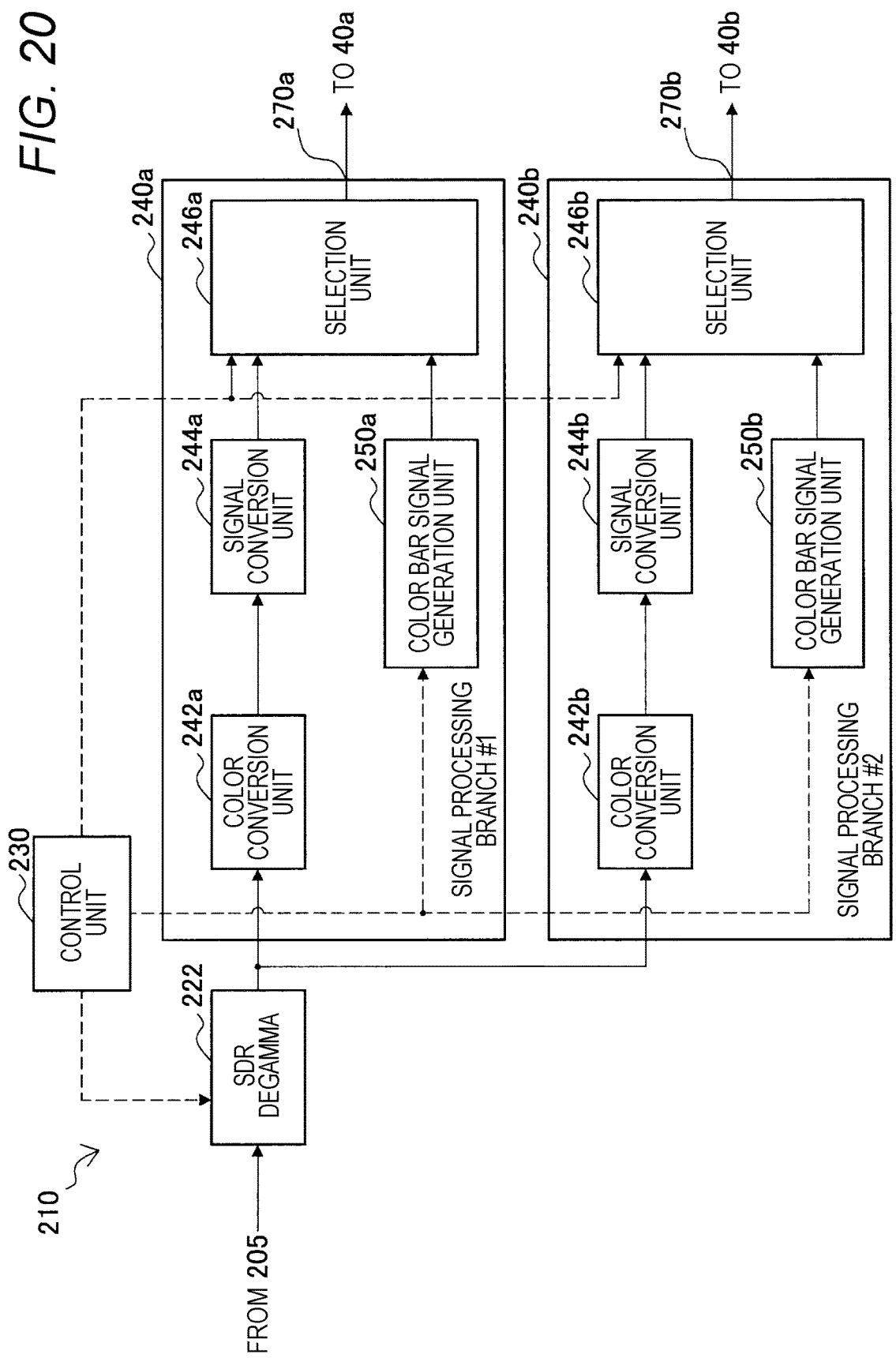
FIG. 20 is a block diagram illustrating a first configuration example of a signal conversion device according to the second embodiment.

FIG. 20 is a block diagram illustrating a first configuration example of the signal conversion device 210. Referring to FIG. 20, the signal conversion device 210 includes an SDR degamma conversion unit 222, a control unit 230, one or more signal processing branches 240 (240a, 240b, and the like), and one or more output interfaces 270 (270a, 270b, and the like). Each signal processing branch 240 includes color conversion units 242 (242a, 242b, and the like), signal conversion units 244 (244a, 244b, and the like), selection units 246 (246a, 246b, and the like), and color bar signal generation units 250 (250a, 250b, and the like).

The SDR degamma conversion unit 222 acquires a content signal from the imaging device 205 that is a signal source, and executes degamma conversion for the acquired content signal. The degamma conversion here is processing corresponding to the degamma conversion 41a illustrated in FIG. 6. The SDR degamma conversion unit 222 may execute degamma conversion with a gamma value instructed by the control unit 230 among a plurality of gamma values (for example, 2.2, 2.4, or 2.6). Then, the SDR degamma conversion unit 222 distributes the content signal after degamma conversion to each of the one or more signal processing branches 240.

The control unit 230 controls generation and selection of signals output from the signal conversion device 210 through the output interfaces 270. The control unit 230 determines, for example, whether or not the display device 40 is connected to each output interface 270. Furthermore, the control unit 230 determines the transfer function to be used in the connected display device 40 among the plurality of transfer functions, for each of the output interfaces 270 that have detected connection of the display devices 40. Moreover, the control unit 230 determines which output mode between the camera mode and the color bar mode has been set, for each of the output interfaces 270.

For example, in a case where it is determined that the camera mode has been set for the output interface 270a, the control unit 230 causes the signal processing branch 240a to process the content signal from the SDR degamma conversion unit 222 and to output the processed content signal from the output interface 270a. More specifically, in a case where color gamut conversion is required for the color gamut to be used in the connected display device 40, the color conversion unit 242a of the signal processing branch 240a converts the color gamut of the content signal into the color gamut to be used. The signal conversion unit 244a executes gamma conversion for the content signal input from the color conversion unit 242a. The selection unit 246a selects the content signal input from the signal conversion unit 244a according to the control of the control unit 230, and outputs the content signal to the display device 40a via the output interface 270a. Similarly, in a case where it is determined that the camera mode has been set for the output interface 270b, the control unit 230 causes the signal processing branch 240b to process the content signal from the SDR degamma conversion unit 222 and to output the processed content signal from the output interface 270b. Since details of processing in the camera mode in the signal processing branch 240b (and other branches) may be similar to the processing in the signal processing branch 240a, description of the processing is omitted here to avoid redundancy.

In a case where it is determined that the color bar mode has been set for the output interface 270a, the control unit 230 causes the signal processing branch 240a to generate a color bar signal corresponding to the transfer function to be used in the connected display device 40 and to output the generated color bar signal to the display device 40. In the signal processing branch 240a, the color bar signal is generated by the color bar signal generation unit 250a. Then, the selection unit 246a selects the color bar signal input from the color bar signal generation unit 250a according to the control of the control unit 230, and outputs the color bar signal to the display device 40a via the output interface 270a. Similarly, In a case where it is determined that the color bar mode has been set for the output interface 270b, the control unit 230 causes the signal processing branch 240b to generate a color bar signal corresponding to the transfer function to be used in the connected display device 40 and to output the generated color bar signal to the display device 40. Since details of processing in the color bar mode in the signal processing branch 240b (and other branches) may be similar to the processing in the signal processing branch 240a, description of the processing is omitted here to avoid redundancy.

The color bar signal generation unit 250 may have a similar configuration to the color bar signal generation unit 150 according to the first embodiment described with reference to FIG. 9. In other words, the color bar signal generation unit 250 includes a storage unit that stores color bar information that defines color bar signals each corresponding to a plurality of transfer function candidates, and outputs the color bar signal formed on the basis of the color bar information read from the storage unit to the selection unit 246. The color bar information may be a set of pieces of image information that define color bar images as described with reference to FIG. 10, or a set of definition data that define structures of color bars as described with reference to FIG. 11. The first color bar information defines the color bar signal corresponding to the first transfer function, the second color bar information defines the color bar signal corresponding to the second transfer function, and the n-th color bar information defines the color bar signal corresponding to the n-th transfer function. For example, the first transfer function may be a transfer function corresponding to a first dynamic range, and the second transfer function may be a transfer function corresponding to a second dynamic range wider than the first dynamic range. Alternatively, the first transfer function may have a first gamma curve and the second transfer function may have a second gamma curve different from the first gamma curve.

The control unit 230 may perform one or more of the determinations a) to e) listed above in relation to the control unit 130, on the basis of a user input detected via the user interface (not illustrated). Furthermore, the control unit 230 may perform the determinations on the basis of control information received via the output interface 270 from the display device 40.

(2) Flow of Signal for Each Output Mode

Figure 21:
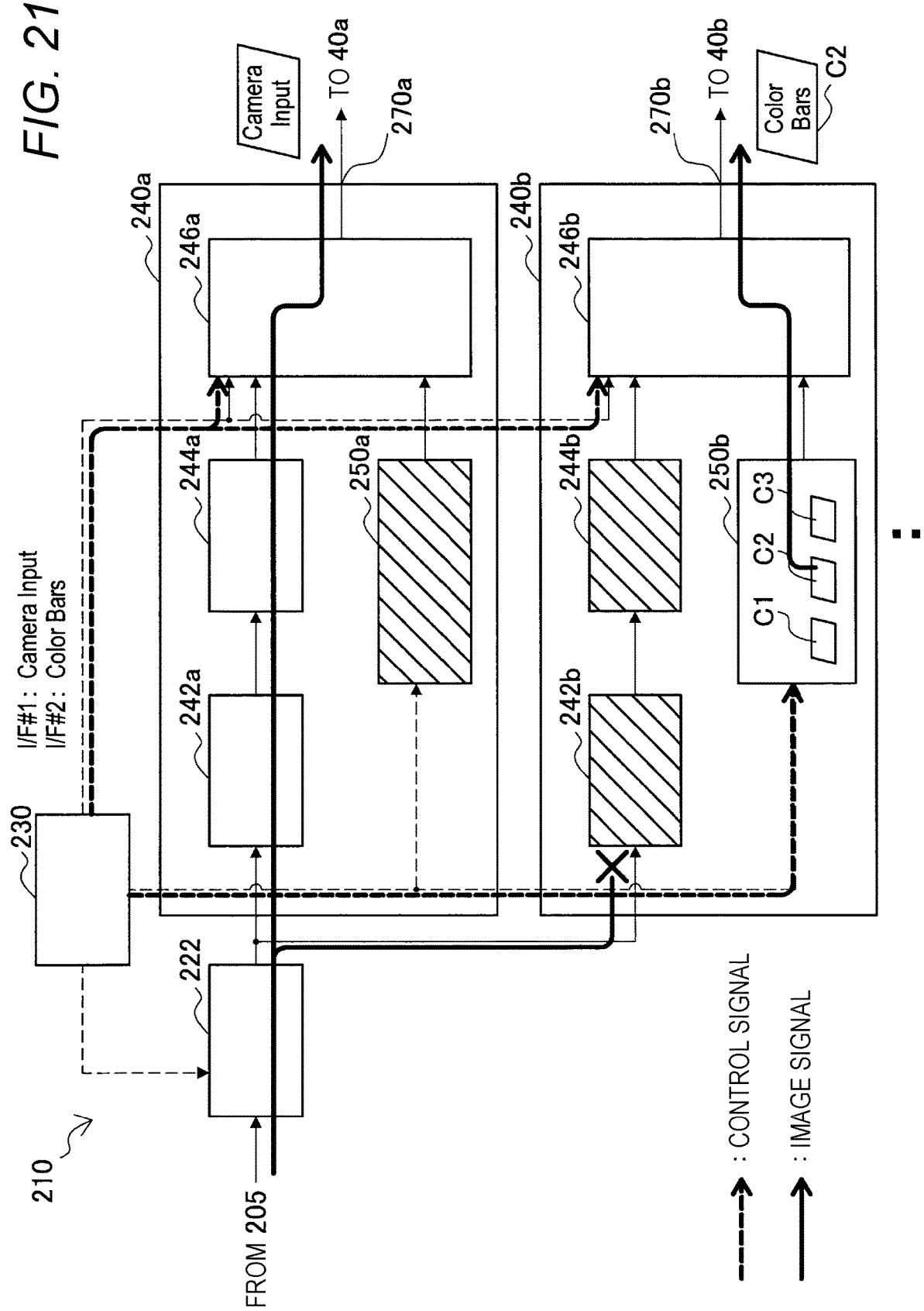
FIG. 21 is an explanatory diagram for describing selection of an output signal in the signal conversion device illustrated in FIG. 20.

FIG. 21 is an explanatory diagram for describing selection of an output signal in the signal conversion device illustrated in FIG. 20. Referring to FIG. 21, an arrow representing a flow of a signal in one scenario is superimposed on a block diagram similar to FIG. 20. A solid arrow represents a flow of an image signal that can be the content signal or the color bar signal, and a broken line arrow represents a flow of a control signal. In the present scenario, it is assumed that the camera mode is set for the output interface 270a and the color bar mode is set for the output interface 270b. Furthermore, it is assumed that the display device 40b is connected to the output interface 270b. The control unit 230 turns on the color conversion unit 242a and the signal conversion unit 244a in the signal processing branch 240a, and causes the selection unit 246a to output the content signal processed through these processing blocks via the output interface 270a. The color bar signal generation unit 250a is turned off. Meanwhile, the control unit 230 turns on the color bar signal generation unit 250b in the signal processing branch 240b, causes the color bar signal generation unit 250b to generate the color bar signal C2 corresponding to the transfer function used in the display device 40b, and causes the selection unit 246b to output the color bar signal C2 via the output interface 270b. The color conversion unit 242b and the signal conversion unit 244b are turned off.

Note that FIG. 21 illustrates a scenario in which different output modes are set for two branches as an example for comparison. However, as a matter of course, the same output mode may be set to two branches as in the above-described scenarios in FIGS. 16A and 16B. In a case where the color bar mode is set for both of two branches, even if the signal transfer characteristics of the display devices 40 connected to the branches are different, the color bar signals predefined to cancel the effects of the transfer functions to be each used are provided to the display devices 40, and thus how the color bars look on the screens of the two display devices 40 becomes substantially equivalent, as a result.

(3) Flow of Processing

Figure 22:
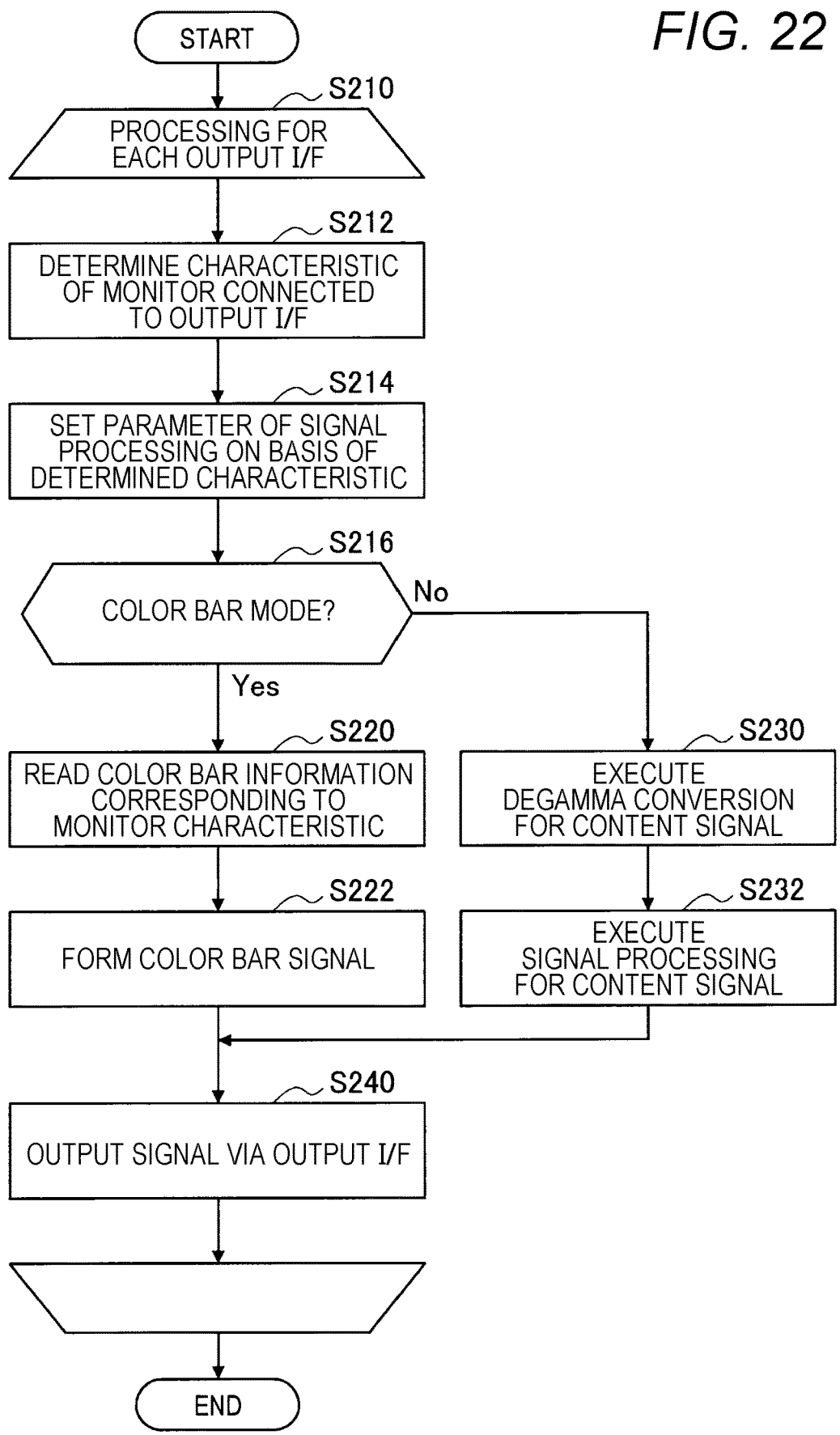
FIG. 22 is a flowchart illustrating an example of a flow of image processing performed by the signal conversion device according to the first configuration example.

FIG. 22 is a flowchart illustrating an example of a flow of image processing performed by the signal conversion device 210 according to the first configuration example. Although a plurality of processing steps is described in the present flowchart, these processing steps do not necessarily have to be executed in the illustrated order. Some processing steps may be executed in parallel. Furthermore, additional processing steps may be employed and some processing steps may be omitted.

The image processing illustrated in FIG. 22 is executed for each of the one or more output interfaces 270 included in the signal conversion device 210 (step S210).

First, the control unit 230 determines the signal transfer characteristic of the display device 40 connected to the output interface 270 (step S212). The signal transfer characteristic of the display device 40 may be determined on the basis of a user input or may be determined on the basis of the control information received from the display device 40.

Next, the control unit 230 sets parameters of the signal processing branch 240 on the basis of the determined signal transfer characteristic (step S214). For example, the control unit 230 may set a gamma curve to be used by the SDR degamma conversion unit 222 in the camera mode. Furthermore, the control unit 230 may set a gamma curve to be used by the signal conversion unit 244 of the signal processing branch 240. Furthermore, the control unit 230 may set color conversion to be applied to the image signal by the color conversion unit 242. Furthermore, the control unit 230 may set which color bar signal corresponding to which transfer function the color bar signal generation unit 250a should generate in the color bar mode.

Next, the control unit 230 determines the set output mode between the camera mode and the color bar mode (step S216). The output mode may be determined on the basis of the user input or may be determined on the basis of the control information received from the display device 40. In a case where the output mode is the color bar mode, the processing proceeds to step S220. Meanwhile, in a case where the output mode is the camera mode, the processing proceeds to step S230.

In the color bar mode, the color bar signal generation unit 250 reads the color bar information corresponding to the characteristic of the display device 40 from the storage unit according to the setting by the control unit 230 (step S220), and forms the color bar signal to be output on the basis of the read color bar information (step S222).

Meanwhile, in the camera mode, the SDR degamma conversion unit 222 executes degamma conversion for the content signal acquired from an external signal source (step S230). Next, in the signal processing branch 240, color conversion by the color conversion unit 242 and gamma conversion by the signal conversion unit 244 are executed for the content signal after degamma conversion (step S232).

Then, the selection unit 246 outputs the color bar signal formed by the color bar signal generation unit 250 in the color bar mode, or the content signal after color conversion and gamma conversion in the camera mode, to the display device 40 via the output interface 270 (step S240).

[3-3. Second Configuration Example of Signal Conversion Device]

In a second configuration example, the signal conversion device 210 stores in advance the first color bar information that defines the color bar signal corresponding to the first transfer function. The color bar signal corresponding to the first transfer function here is a reference color bar signal, and the first color bar information is reference color bar information. Then, the signal conversion device 210 dynamically generates the color bar signal corresponding to the transfer function determined to be used in the display device 40 connected to each output interface 270 from the reference color bar information.

(1) Functional Configuration

Figure 23:
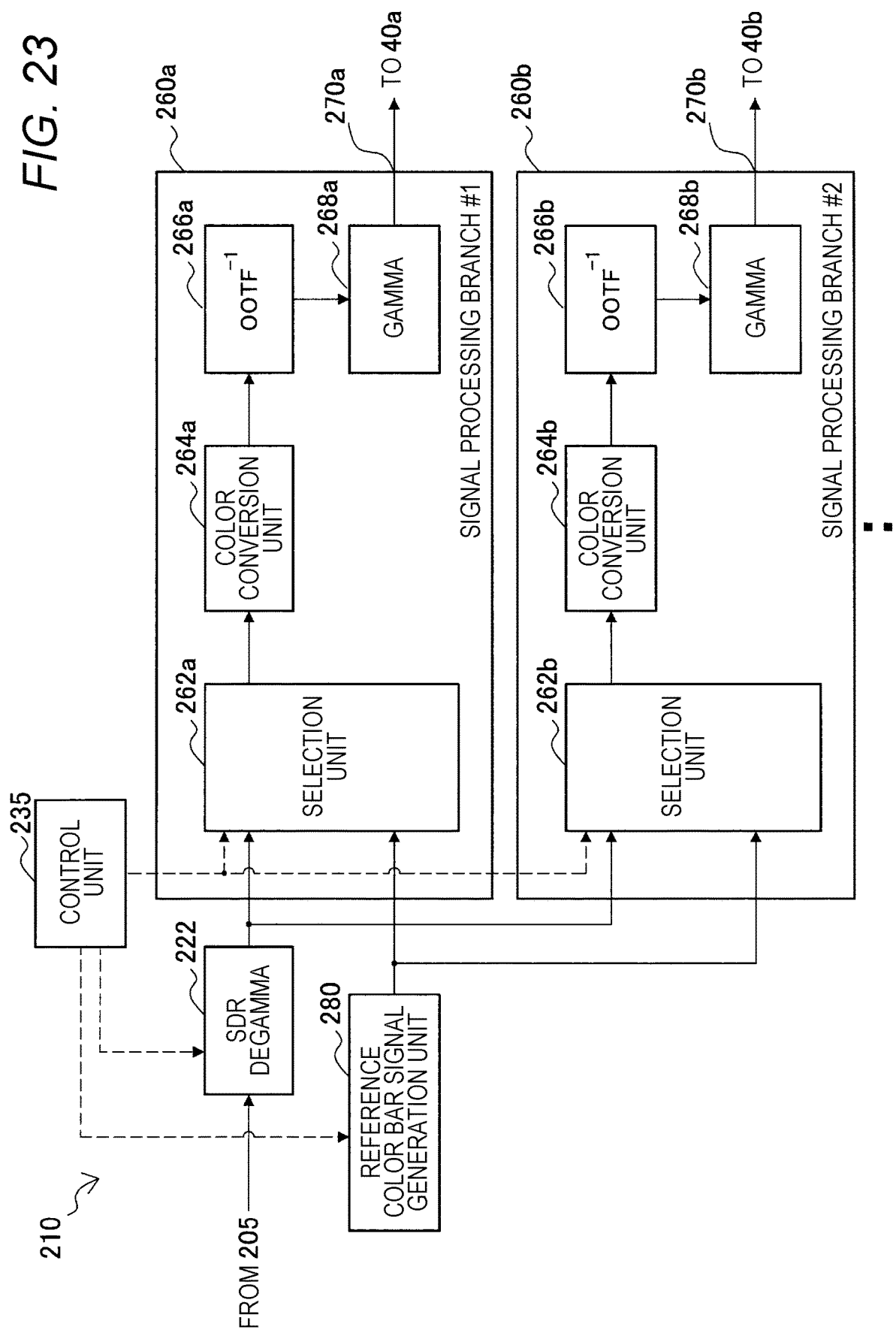
FIG. 23 is a block diagram illustrating a second configuration example of the signal conversion device according to the second embodiment.

FIG. 23 is a block diagram illustrating the second configuration example of the signal conversion device 210. Referring to FIG. 23, the signal conversion device 210 includes the SDR degamma conversion unit 222, a control unit 235, one or more signal processing branches 260 (260a, 260b, and the like), the one or more output interfaces 270 (270a, 270b, and the like), and a reference color bar signal generation unit 280. Each signal processing branch 260 includes selection units 262 (262a, 262b, and the like), color conversion units 264 (264a, 264b, and the like), an inverse OOTF conversion units 266 (266a, 266b, and the like), and a gamma conversion units 268 (268a, 268b, and the like).

In the second configuration example, the control unit 235 controls generation and selection of signals output from the signal conversion device 210 via the output interfaces 270. The control unit 235 determines, for example, whether or not the display device 40 is connected to each output interface 270. Furthermore, the control unit 235 determines the transfer function to be used in the connected display device 40 among the plurality of transfer functions, for each of the output interfaces 270 that have detected connection of the display devices 40. Moreover, the control unit 235 determines which output mode between the camera mode and the color bar mode has been set, for each of the output interfaces 270. Each of these determinations may be made on the basis of the user input detected through the user interface or may be made on the basis of the control information received from the display device 40 as in the first configuration example.

For example, in a case where it is determined that the camera mode has been set for the output interface 270a, the control unit 235 causes the signal processing branch 260a to process the content signal from the SDR degamma conversion unit 222 and to output the processed content signal from the output interface 270a. More specifically, the selection unit 262a of the signal processing branch 260a selects the content signal input from the SDR degamma conversion unit 222 according to the control of the control unit 235, and outputs the content signal to the color conversion unit 264a. In a case where color gamut conversion is required for the color gamut to be used in the connected display device 40, the color conversion unit 264a converts the color gamut of the content signal into the color gamut to be used. The inverse OOTF conversion unit 266a is turned off in the camera mode, and simply passes the content signal to the gamma conversion unit 268a. The gamma conversion unit 268a executes gamma conversion for the content signal processed by the color conversion unit 264a. Then, the gamma conversion unit 268a outputs the content signal to the display device 40 via the output interface 270a. Similarly, in a case where it is determined that the camera mode has been set for the output interface 270b, the control unit 235 causes the signal processing branch 260b to process the content signal from the SDR degamma conversion unit 222 and to output the processed content signal from the output interface 270b. Since details of processing in the camera mode in the signal processing branch 260b (and other branches) may be similar to the processing in the signal processing branch 260a, description of the processing is omitted here to avoid redundancy.

In a case where it is determined that the color bar mode has been set for the output interface 270a, the control unit 235 causes the signal processing branch 260a to generate a color bar signal corresponding to the transfer function to be used in the connected display device 40 and to output the generated color bar signal to the display device 40. In the second configuration example, a color bar signal generation unit is substantially configured by the reference color bar signal generation unit 280 and partial processing blocks of each signal processing branch 260. Here, the partial processing block may be, for example, one or more of the color conversion unit 264, the inverse OOTF conversion unit 266, and the gamma conversion unit 268. In other words, in the second configuration example, color bar signals corresponding to the respective transfer functions are generated through signal conversion using the circuit of the signal processing branch 260 shared between the two output modes from the reference color bar signal generated by the reference color bar signal generation unit 280.

The reference color bar signal generation unit 280 may have a similar configuration to the reference color bar signal generation unit 180 according to the first embodiment described with reference to FIG. 15. In other words, the reference color bar signal generation unit 280 includes a storage unit that stores the reference color bar information that defines the reference color bar signal corresponding to one of the plurality of transfer function candidates, and executes degamma conversion for the reference color bar signal formed on the basis of the reference color bar information read from the storage unit. The degamma conversion here is processing corresponding to the degamma conversion 41a illustrated in FIG. 6. Then, the reference color bar signal generation unit 280 outputs the reference color bar signal after the degamma conversion to the one or more signal processing branches 260.

In the color bar mode, the selection unit 262a of the signal processing branch 260a selects the reference color bar signal input from the reference color bar signal generation unit 280 according to the control of the control unit 235, and outputs the reference color bar signal to the color conversion unit 264a. In a case where color gamut conversion is required for the color gamut to be used in the connected display device 40, the color conversion unit 264a converts the color gamut of the reference color bar signal into the color gamut to be used. In a case where the transfer function to be used in the connected display device 40 includes the OOTF, the inverse OOTF conversion unit 266a applies the inverse conversion processing of the OOTF conversion to the reference color bar signal. The gamma conversion unit 268a executes, for the reference color bar signal, gamma conversion with the inverse function of the transfer function to be used in the connected display device 40, and generates a color bar signal corresponding to the transfer function. Then, the gamma conversion unit 268a outputs the generated color bar signal to the display device 40 via the output interface 270a. Similarly, in a case where it is determined that the color bar mode has been set for the output interface 270b, the control unit 235 causes the signal processing branch 260b to process the reference color bar signal from the reference color bar signal generation unit 280 and to output the generated color bar signal from the output interface 270b. Since details of processing in the color bar mode in the signal processing branch 260b (and other branches) may be similar to the processing in the signal processing branch 260a, description of the processing is omitted here to avoid redundancy.

In the second configuration example, the reference color bar signal defined by the reference color bar information is typically a prespecified signal corresponding to the first transfer function. Another color bar signal dynamically generated from the reference color bar signal through signal conversion corresponds to a transfer function different from the first transfer function. For example, the first transfer function may be a transfer function corresponding to a first dynamic range, and the another transfer function may be a transfer function corresponding to a second dynamic range wider than the first dynamic range. Alternatively, the first transfer function may have a first gamma curve, and the another transfer function may have another gamma curve different from the first gamma curve.

(2) Flow of Signal for Each Output Mode

Figure 24A:
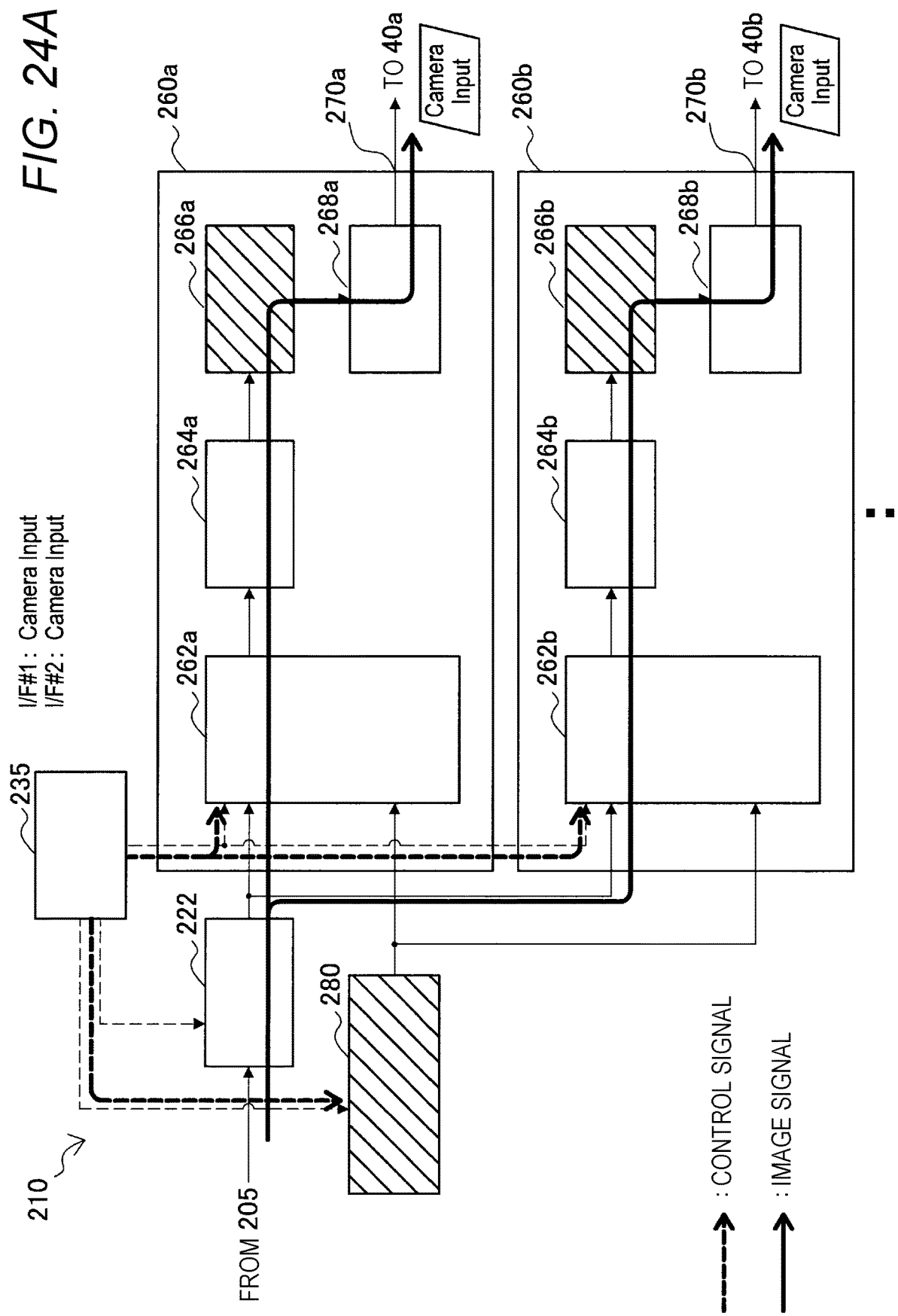
FIG. 24A is a first explanatory diagram for describing selection of an output signal in the signal conversion device illustrated in FIG. 23.

FIG. 24A is a first explanatory diagram for describing selection of an output signal in the signal conversion device illustrated in FIG. 23. Unlike the scenario illustrated in FIG. 21, it is assumed here that the camera mode is set for both the output interface 270a and the output interface 270b. The control unit 235 causes the selection unit 262a to select the content signal in the signal processing branch 260a. Then, the control unit 235 turns on the processing blocks except the inverse OOTF conversion unit 266a in the signal processing branch 260a, and causes the content signal processed through these processing blocks to be output via the output interface 270a. Similarly, the control unit 235 causes the selection unit 262b to select the content signal in the signal processing branch 260b. Then, the control unit 235 turns on the processing blocks except the inverse OOTF conversion unit 266b in the signal processing branch 260b, and causes the content signal processed through these processing blocks to be output via the output interface 270b. In a case where the signal transfer characteristics of the display devices each connected to the output interfaces 270a and 270b are different, the content signals output from the interfaces have different signal values as a result of applying different signal conversions. In a case where there is no output interface 270 for which the color bar mode has been set, the reference color bar signal generation unit 280 is turned off.

FIG. 24B is a second explanatory diagram for describing selection of an output signal in the signal conversion device illustrated in FIG. 23. Unlike the scenario illustrated in FIGS. 21 and 24A, it is assumed here that the color bar mode is set for both the output interface 270a and the output interface 270b. The control unit 235 causes the selection unit 262a to select the reference color bar signal from the reference color bar signal generation unit 280 in the signal processing branch 260a. Then, the control unit 235 turns on all the processing blocks in the signal processing branch 260a, and causes the color bar signal corresponding to the transfer function to be used in the connected display device to be generated from the reference color bar signal according to the principle described using FIG. 6. The generated color bar signal is output via the output interface 270a. In the example in FIG. 24B, the color bar signal C1 is output via the output interface 270a. Similarly, the control unit 235 causes the selection unit 262b to select the reference color bar signal from the reference color bar signal generation unit 280 in the signal processing branch 260b. Then, the control unit 235 turns on all the processing blocks in the signal processing branch 260b, and causes the color bar signal corresponding to the transfer function to be used in the connected display device to be generated from the reference color bar signal according to the principle described using FIG. 6. The generated color bar signal is output via the output interface 270b. In the example in FIG. 24B, the color bar signal C2 is output via the output interface 270b. As described above, how the color bars displayed on the screens of the display devices 40 look on the basis of the color bar signals, as a result of applying the signal conversion for canceling effects of transfer functions to be used by the display devices at the output destination to the reference color bar signal by the signal processing branches 260, becomes substantially equivalent. In a case where there is no output interface 270 for which the camera mode has been set, the SDR degamma conversion unit 222 can be turned off.

Note that, as a matter of course, different output modes may be set for two or more branches in other scenarios.

(3) Flow of Processing

Figure 25:
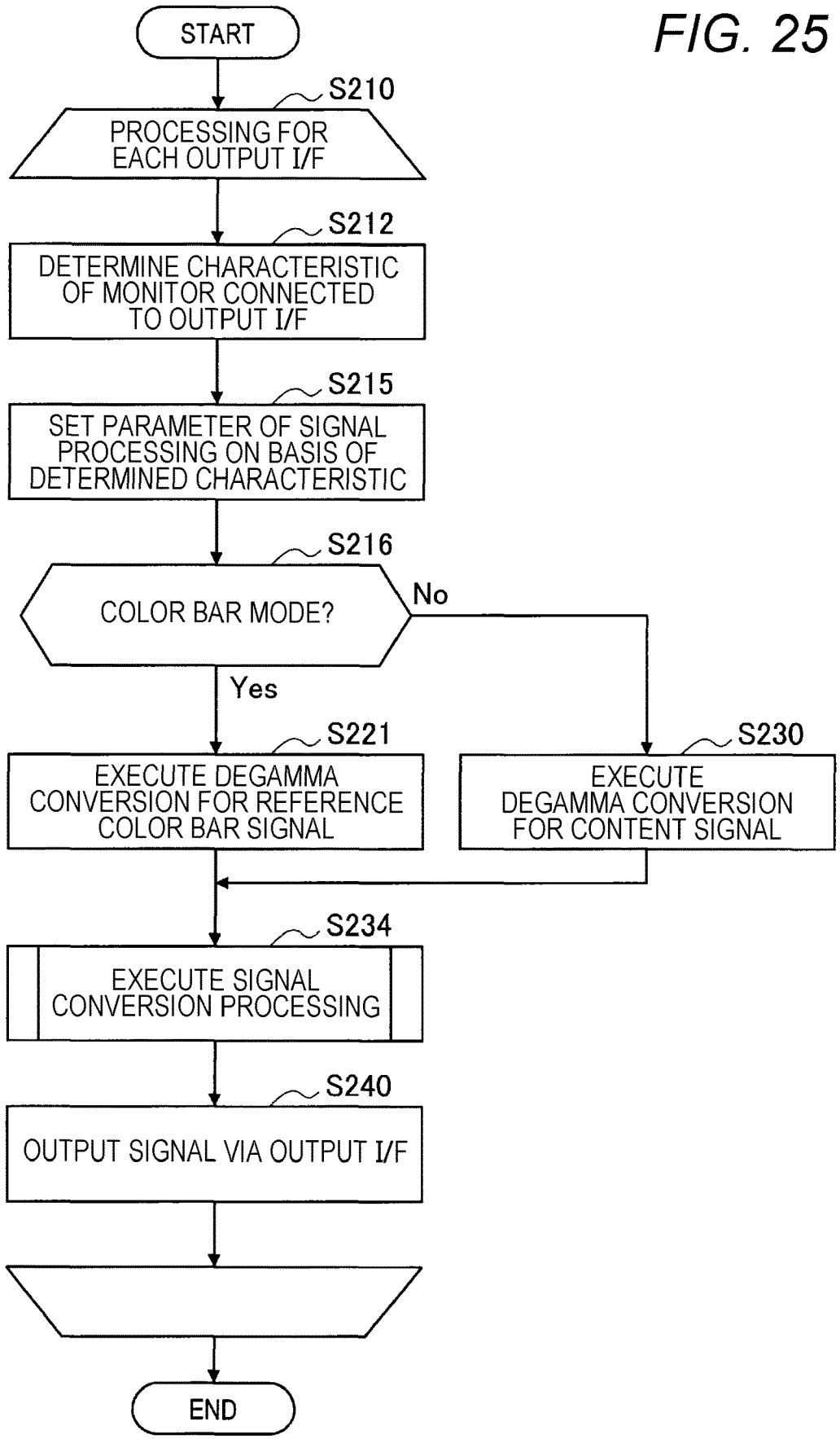
FIG. 25 is a flowchart illustrating an example of a flow of image processing performed by the signal conversion device according to the second configuration example.

FIG. 25 is a flowchart illustrating an example of a flow of image processing performed by the signal conversion device 210 according to the second configuration example. Although a plurality of processing steps is described in the present flowchart, these processing steps do not necessarily have to be executed in the illustrated order. Some processing steps may be executed in parallel. Furthermore, additional processing steps may be employed and some processing steps may be omitted.

The image processing illustrated in FIG. 25 is executed for each of the one or more output interfaces 270 included in the signal conversion device 210 (step S210).

First, the control unit 235 determines the signal transfer characteristic of the display device 40 connected to the output interface 270 (step S212). The signal transfer characteristic of the display device 40 may be determined on the basis of a user input or may be determined on the basis of the control information received from the display device 40.

Next, the control unit 235 sets parameters of the signal processing branch 260 on the basis of the determined signal transfer characteristic (step S215). For example, the control unit 235 may set a gamma curve to be used by the gamma conversion unit 268 of the signal processing branch 260. Furthermore, the control unit 235 may set color conversion to be applied to the image signal by the color conversion unit 264. Furthermore, the control unit 235 may set a gamma curve to be used by the SDR degamma conversion unit 222 and the reference color bar signal generation unit 280. Furthermore, the control unit 235 may set a tone curve to be used by the inverse OOTF conversion unit 266.

Next, the control unit 235 determines the set output mode between the camera mode and the color bar mode (step S216). The output mode may be determined on the basis of the user input or may be determined on the basis of the control information received from the display device 40. In a case where the output mode is the color bar mode, the processing proceeds to step S221. Meanwhile, in a case where the output mode is the camera mode, the processing proceeds to step S230.

In the color bar mode, the reference color bar signal generation unit 280 executes degamma conversion for the reference color bar signal formed on the basis of the reference color bar information (step S221).

Meanwhile, in the camera mode, the SDR degamma conversion unit 222 executes degamma conversion for the content signal acquired from an external signal source (step S230).

Next, in the signal processing branch 260, signal conversion processing is executed for an image signal selected by the selection unit 262 from the reference color bar signal and the content signal (step S234). The signal conversion processing executed here may be similar to the processing according to the first embodiment described using FIG. 18.

Then, the color bar signal after signal conversion in the color bar mode or the content signal after signal conversion in the camera mode is output to the display device 40 via the output interface 270 (step S240).

4. HARDWARE CONFIGURATION EXAMPLE

The embodiments described above may be implemented using any of software, hardware, and a combination of software and hardware. In a case where the imaging device 110 or the signal conversion device 210 uses software, a program configuring the software is stored in advance in, for example, a storage medium (non-transitory medium) provided inside or outside the device. Then, each program is read into, for example, a random access memory (RAM) at the time of execution, and is executed by a processor such as a central processing unit (CPU).

Figure 26:
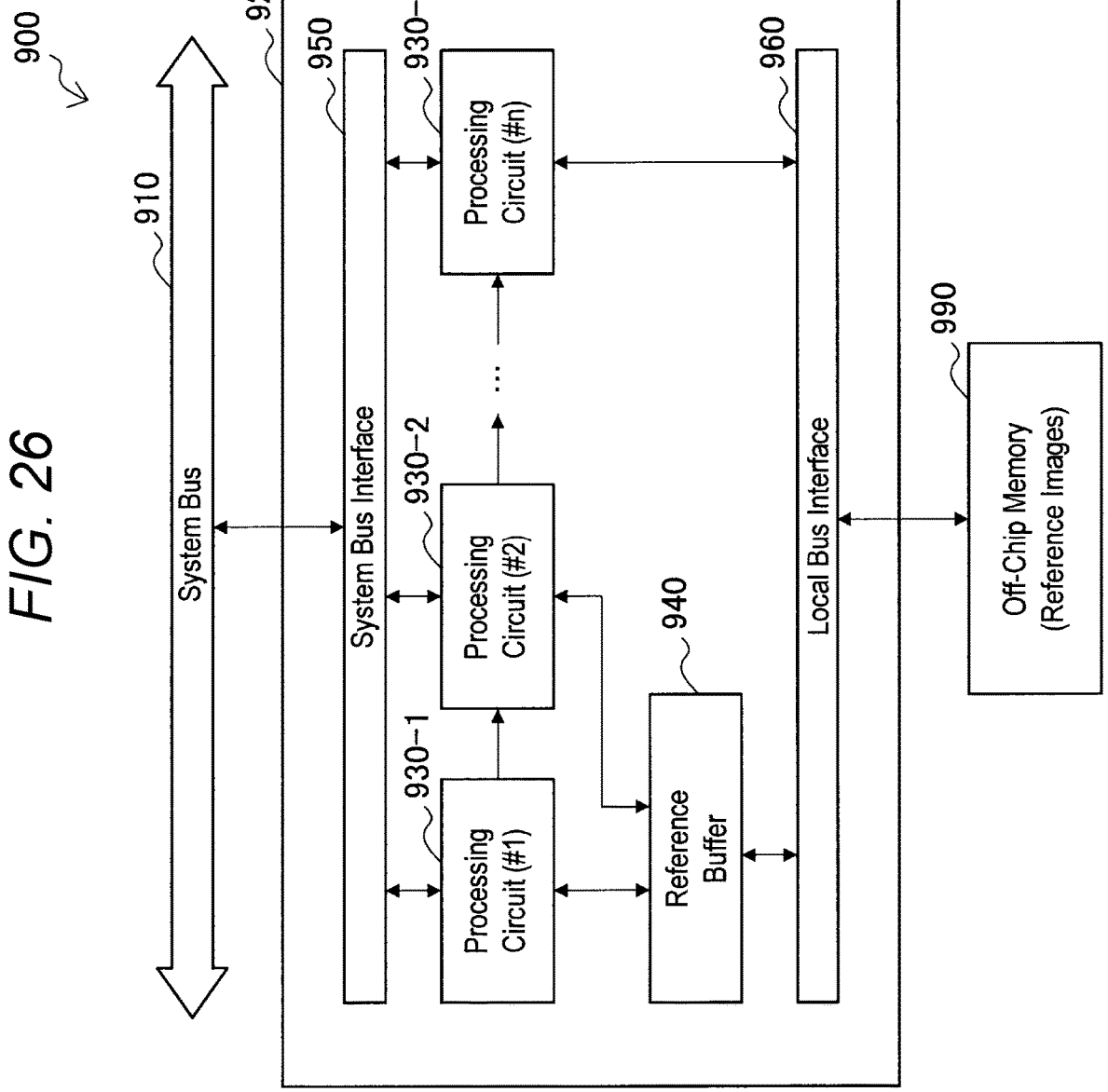
FIG. 26 is a block diagram illustrating an example of a hardware configuration of a device.

FIG. 26 is a block diagram illustrating an example of a hardware configuration of a device to which one or more of the above-described embodiments are applicable. Referring to FIG. 26, an image processing device 900 includes a system bus 910, an image processing chip 920, and an off-chip memory 990. The image processing chip 920 includes n (n is 1 or larger) processing circuits 930-1, 930-2, . . . , and 930-n, a reference buffer 940, a system bus interface 950, and a local bus interface 960.

The system bus 910 provides a communication path between the image processing chip 920 and an external module (for example, a central control function, an application function, a communication interface, a user interface, or the like). The processing circuits 930-1, 930-2, . . . , and 930-n are connected to the system bus 910 via the system bus interface 950 and connected to the off-chip memory 990 via the local bus interface 960. The processing circuits 930-1, 930-2, . . . , and 930-n can also access the reference buffer 940, which can correspond to on-chip memory (for example, SRAM). The off-chip memory 990 may be, for example, a frame memory that stores image data processed by the image processing chip 920. As an example, the processing circuit 930-1 may be used for control and determination, and the processing circuit 930-2 may be used for signal conversion such as gamma conversion and degamma conversion. Note that these processing circuits may be formed on separate chips, instead of on the same image processing chip 920.

5. CONCLUSION

Several embodiments of the technology according to the present disclosure have been described so far with reference to FIGS. 1 to 26. According to the above-described embodiment, a color bar signal corresponding to a transfer function related to conversion between light and an image signal and to be used in a display device among a plurality of transfer functions is generated in an image processing device, and the generated color bar signal is output to the display device. Therefore, even if transfer functions used in a plurality of display devices are different or transfer functions used at different timings in one display device are different, color bar signals adjusted to absorb the difference in the transfer functions can be provided to the respective display devices to make how color bars look substantially equivalent. Thereby, settings of the display devices can be appropriately adjusted or calibrated using the color bars. For example, the color bar signal to be provided to each display device may be a signal dynamically generated by converting a reference color bar signal according to the transfer function of the display device or defined in advance such that luminance of when the color bar based on the color bar signal is displayed on the display device matches luminance of a reference color bar. Thereby, the color bar can be displayed in the same way as the reference color bar on a regular basis over a plurality of display devices having different transfer functions or regardless of switching in a display device capable of switching the transfer function.

In an example, the image processing device may store in advance reference color bar information that defines a color bar signal corresponding to a first transfer function serving as a reference, and may generate a color bar signal corresponding to another transfer function from the reference color bar information. According to the configuration, the need to store in advance a large amount of color bar information corresponding to various signal transfer characteristics of the display devices is avoided, and a memory source required for implementing the above-described mechanism can be decreased. In a case where the transfer function used in the display device is a second transfer function different from the first transfer function, signal conversion according the second transfer function is applied to the color bar signal generated from the reference color bar information, whereby, a color bar signal corresponding to the second transfer function is generated. This signal conversion is set to inverse conversion of the signal conversion to be executed in the display device (for example, gamma conversion based on a gamma curve corresponding to the second transfer function), whereby a color bar having equivalent how it looks to the reference color bar can be displayed on the display device using the second transfer function as a result.

In an example, in a case where the color gamut used together with the first transfer function corresponding to the reference color bar signal and the color gamut used together with the second transfer function are different, the color bar signal corresponding to the second transfer function may be generated by further applying color gamut conversion to the reference color bar signal. According to the configuration, the difference in how the color bars look due to the difference in the color gamuts can be eliminated, and adjustment or calibration of settings of the display devices using the color bars can be performed with higher precision.

In one example, the image processing device may store in advance color bar information that defines color bar signals each corresponding to a plurality of transfer functions, and may read the color bar information corresponding to the transfer function determined to be used in the display device and generate the color bar signal corresponding to the transfer function. According to the configuration, the need to dynamically execute the signal conversion dependent on a signal transfer characteristic of the display device can be avoided, and processing resources or a circuit scale required for implementing the above-described mechanism can be decreased.

As an example, the above-described first transfer function may correspond to a first luminance dynamic range, and the second transfer function may correspond to a second luminance dynamic range wider than the first luminance dynamic range. In this case, how the color bar looks on the display device for HDR display can be adapted to coincide with how the existing color bar looks, which is designed on the premise of SDR display. In other words, an inconvenience that an existing color bar is displayed excessively bright on a monitor for HDR can be prevented.

As another example, the above-described first transfer function may have a first gamma curve and the second transfer function may have a second gamma curve different from the first gamma curve. In this case, even in a case where two display devices for HDR display have gamma curves different from each other (for example, an HLG curve and a PQ curve), how the color bars look on the display devices can be made substantially equivalent.

In a case where the transfer function to be used in each display device is determined on the basis of a user input, the user can freely switch how the color bar looks to adjust the settings of the monitor as the user desires. In a case where the transfer function to be used in each display device is determined on the basis of control information received from the display device, the user input is not required, and the color bar signal suitable for the each display device can be automatically provided.

In an embodiment, an image processing device may further include a first output interface connected to a first display device and a second output interface connected to a second display device, and a color bar signal corresponding to a transfer function to be used in the first display device may be output to the first display device via the first output interface and a color bar signal corresponding to a transfer function to be used in the second display device may be output to the second display device via the second output interface. According to the configuration, how color bars look, which is simultaneously displayed on two display devices having signal transfer characteristics different from each other, can be made substantially equivalent.

In an embodiment, the image processing device is an imaging device, and the above-described signal conversion for a color bar signal can be executed using a circuit shared with signal conversion to be applied to an image signal generated by an imaging unit. According to the configuration, the imaging device that provides a multi-format color bar can be implemented while suppressing the increase in the circuit scale as the entire device.

The favorable embodiments of the present disclosure have been described in detail with reference to the accompanying drawings, but the present technology is not limited to such examples. It is obvious that persons having ordinary knowledge in the technical field of the present disclosure can conceive various changes and alterations within the scope of the technical idea described in the claims, and it is naturally understood that these changes and alterations belong to the technical scope of the present disclosure.

Furthermore, the effects described in the present specification are merely illustrative or exemplary and are not restrictive. That is, the technology according to the present disclosure can exhibit other effects obvious to those skilled in the art from the description of the present specification in addition to or in place of the above-described effects.

Note that the following configurations also belong to the technical scope of the present disclosure.

(1)

An image processing device including:

a determination unit configured to determine a transfer function related to conversion between light and an image signal and to be used in a display device among a plurality of transfer functions; and a generation unit configured to generate a color bar signal corresponding to the transfer function determined by the determination unit and output the generated color bar signal to the display device.

(2)

The image processing device according to (1), further including:

a storage unit configured to store first color bar information defining a color bar signal corresponding to a first transfer function, in which the generation unit generates the color bar signal corresponding to the determined transfer function from the first color bar information.

(3)

The image processing device according to (2), in which, in a case where the determined transfer function is a second transfer function, the generation unit applies signal conversion according to the second transfer function to the color bar signal generated from the first color bar information to generate a color bar signal corresponding to the second transfer function.

(4)

The image processing device according to (3), in which the color bar signal corresponding to the first transfer function is a reference color bar signal, and the signal conversion according to the second transfer function includes converting the reference color bar signal according to the second transfer function such that luminance of when a color bar based on the color bar signal is displayed on the display device coincides with luminance of a reference color bar.

(5)

The image processing device according to (3) or (4), in which the signal conversion according to the second transfer function includes gamma conversion based on a gamma curve corresponding to the second transfer function.

(6)

The image processing device according to any one of (3) to (5), in which, in a case where a color gamut used together with the first transfer function and a color gamut used together with the second transfer function are different, the generation unit further applies color gamut conversion to the color bar signal to generate the color bar signal corresponding to the second transfer function.

(7)

The image processing device according to (1), further including:

a storage unit configured to store first color bar information defining a color bar signal corresponding to a first transfer function and second color bar information defining a color bar signal corresponding to a second transfer function, in which the generation unit generates the color bar signal corresponding to the first transfer function from the first color bar information in a case where the determined transfer function is the first transfer function, and generates the color bar signal corresponding to the second transfer function from the second color bar information in a case where the determined transfer function is the second transfer function.

(8)

The image processing device according to (7), in which the first color bar information defines a reference color bar signal expressing a reference color bar, and the second color bar information defines a color bar signal generated in advance by converting the reference color bar signal according to the second transfer function such that luminance of when a color bar based on the color bar signal corresponding to the second transfer function is displayed on the display device coincides with luminance of the reference color bar.

(9)

The image processing device according to any one of (1) to (8), in which the plurality of transfer functions includes a first transfer function corresponding to a first dynamic range and a second transfer function corresponding to a second dynamic range wider than the first dynamic range.

(10)

The image processing device according to any one of (1) to (8), in which the plurality of transfer functions includes a first transfer function having a first gamma curve and a second transfer function having a second gamma curve different from the first gamma curve.

(11)

The image processing device according to any one of (1) to (10), in which the determination unit determines the transfer function to be used in the display device on the basis of input information acquired via a user interface.

(12)

The image processing device according to any one of (1) to (10), in which the determination unit determines the transfer function to be used in the display device on the basis of control information received from the display device.

(13)

The image processing device according to any one of (1) to (12), further including:

a first output interface connected to a first display device; and a second output interface connected to a second display device, in which the determination unit determines transfer functions to be each used in the first display device and the second display device, and the generation unit outputs a color bar signal corresponding to the transfer function determined for the first display device to the first display device via the first output interface, and outputs a color bar signal corresponding to the transfer function determined for the second display device to the second display device via the second output interface.

(14)

The image processing device according to any one of (3) to (6), further including:

an imaging unit; and a signal processing unit configured to apply signal conversion to an image signal generated by the imaging unit, in which the generation unit executes the signal conversion for the color bar signal, using a circuit shared by the signal conversion for the image signal in the signal processing unit.

(15)

The image processing device according to any one of (1) to (13), further including:

an input interface configured to acquire an image signal from a signal source; and an output interface configured to selectively output the image signal or the color bar signal to the display device.

(16)

An image processing method including:

in an image processing device, determining a transfer function related to conversion between light and an image signal and to be used in a display device among a plurality of transfer functions;

generating a color bar signal corresponding to the determined transfer function; and outputting the generated color bar signal to the display device.

REFERENCE SIGNS LIST

10 Color bar
20 Signal source
30 Multi-format color bar providing device (image processing device)
40 Display device
100, 200 Image processing system
110 Imaging device (image processing device)
120 Image sensor (imaging unit)
130, 135 Control unit (determination unit)
140, 160 Signal processing branch (signal processing unit)
150 Color bar signal generation unit
170 Output interface 180 Reference color bar signal generation unit
210 Signal conversion device (image processing device)
230, 235 Control unit (determination unit)
240, 260 Signal processing branch (signal processing unit)
250 Color bar signal generation unit
270 Output interface
280 Reference color bar signal generation unit

The invention claimed is:

1. An image processing device comprising:
   at least one processor configured to
   determine a transfer function related to conversion between light and an image signal and to be used in a display device among a plurality of transfer functions; and
   generate a color bar signal corresponding to the determined transfer function and output the generated color bar signal to the display device, wherein the color bar signal comprises an image to be displayed on the display device, the image including a test pattern of defined color bars in defined regions of the image.

2. The image processing device according to claim 1, further comprising:
   a memory configured to store first color bar information defining a color bar signal corresponding to a first transfer function, wherein
   the at least one processor is configured to generate the color bar signal corresponding to the determined transfer function from the first color bar information.

3. The image processing device according to claim 2, wherein the determined transfer function is a second transfer function, and the at least one processor is configured to apply signal conversion according to the second transfer function to the color bar signal generated from the first color bar information to generate a color bar signal corresponding to the second transfer function.

4. The image processing device according to claim 3, wherein
   the color bar signal corresponding to the first transfer function is a reference color bar signal, and
   the signal conversion according to the second transfer function includes converting the reference color bar signal according to the second transfer function such that luminance of a color bar based on the converted reference color bar signal, which is displayed on the display device, coincides with luminance of a reference color bar.

5. The image processing device according to claim 3, wherein the signal conversion according to the second transfer function includes gamma conversion based on a gamma curve corresponding to the second transfer function.

6. The image processing device according to claim 3, wherein a color gamut used together with the first transfer function and a color gamut used together with the second transfer function are different, and the at least one processor is configured to apply color gamut conversion to the color bar signal to generate the color bar signal corresponding to the second transfer function.

7. The image processing device according to claim 3, further comprising:
   image capturing circuitry; and
   a signal processor configured to apply signal conversion to an image signal generated by the image capturing circuitry, wherein
   the at least one processor is configured to execute the signal conversion for the color bar signal, using a circuit used for the signal conversion of the image signal in the signal processor.

8. The image processing device according to claim 1, further comprising:
   a memory configured to store first color bar information defining a color bar signal corresponding to a first transfer function and second color bar information defining a color bar signal corresponding to a second transfer function, wherein
   the at least one processor is configured to generate the color bar signal corresponding to the first transfer function from the first color bar information in a case where the determined transfer function is the first transfer function, and to generate the color bar signal corresponding to the second transfer function from the second color bar information in a case where the determined transfer function is the second transfer function.

9. The image processing device according to claim 8, wherein
   the first color bar information defines a reference color bar signal expressing a reference color bar, and
   the second color bar information defines a color bar signal generated in advance by converting the reference color bar signal according to the second transfer function such that luminance of a color bar based on the color bar signal corresponding to the second transfer function, which is is displayed on the display device, coincides with luminance of the reference color bar.

10. The image processing device according to claim 1, wherein the plurality of transfer functions includes a first transfer function corresponding to a first dynamic range and a second transfer function corresponding to a second dynamic range wider than the first dynamic range.

11. The image processing device according to claim 1, wherein the plurality of transfer functions includes a first transfer function having a first gamma curve and a second transfer function having a second gamma curve different from the first gamma curve.

12. The image processing device according to claim 1, wherein the at least one processor is configured to determine the transfer function to be used in the display device on a basis of input information acquired via a user interface.

13. The image processing device according to claim 1, wherein the at least one processor is configured to determine the transfer function to be used in the display device on a basis of control information received from the display device.

14. The image processing device according to claim 1, further comprising:
   a first output interface connected to a first display device; and
   a second output interface connected to a second display device, wherein
   the at least one processor is configured to
   determine transfer functions to be used respectively in the first display device and the second display device, and
   output, as the generated color bar signal, a color bar signal corresponding to the transfer function determined for the first display device to the first display device via the first output interface, and output, as the generated color bar signal, a color bar signal corresponding to the transfer function determined for the second display device to the second display device via the second output interface.

15. An image processing device comprising:
at least one processor configured to
- determine a transfer function related to conversion between light and an image signal and to be used in a display device among a plurality of transfer functions; and
- generate a color bar signal corresponding to the determined transfer function and output the generated color bar signal to the display device, an input interface configured to acquire the image signal from a signal source; and an output interface configured to selectively output the image signal or the generated color bar signal to the display device.

16. An image processing method comprising:
in an image processing device,
- determining a transfer function related to conversion between light and an image signal and to be used in a display device among a plurality of transfer functions;
- generating a color bar signal corresponding to the determined transfer function; and
- outputting the generated color bar signal to the display device, wherein the color bar signal comprises an image to be displayed on the display device, the image including a test pattern of defined color bars in defined regions of the image.

* * * * *